US009199629B2

(12) United States Patent
Ishikawa et al.

(10) Patent No.: US 9,199,629 B2
(45) Date of Patent: Dec. 1, 2015

(54) AUTOMATIC TRANSMISSION

(71) Applicant: HONDA MOTOR CO., LTD., Tokyo (JP)

(72) Inventors: Yutaka Ishikawa, Saitama (JP); Yuya Tachibanada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/198,000

(22) Filed: Mar. 5, 2014

(65) Prior Publication Data

US 2014/0256497 A1    Sep. 11, 2014

(30) Foreign Application Priority Data

Mar. 7, 2013  (JP) .................................. 2013-045852
Jan. 8, 2014  (JP) .................................. 2014-001967

(51) Int. Cl.
 *B60W 10/02* (2006.01)
 *B60W 10/11* (2012.01)
 *F16H 3/66* (2006.01)
 *F16H 3/44* (2006.01)
 *F16H 61/16* (2006.01)

(52) U.S. Cl.
 CPC ............... *B60W 10/11* (2013.01); *B60W 10/02* (2013.01); *F16H 3/66* (2013.01); *F16H 61/16* (2013.01); *F16H 2003/442* (2013.01); *F16H 2061/165* (2013.01); *F16H 2200/0069* (2013.01); *F16H 2200/2012* (2013.01); *F16H 2200/2043* (2013.01); *F16H 2200/2084* (2013.01); *F16H 2200/2094* (2013.01)

(58) Field of Classification Search
 CPC combination set(s) only.
 See application file for complete search history.

(56) References Cited

U.S. PATENT DOCUMENTS

| 4,944,200 A * | 7/1990 | Benford et al. ............... 477/155 |
| 5,211,080 A * | 5/1993 | Leising et al. ............... 475/123 |
| 5,947,856 A * | 9/1999 | Tabata et al. .................. 475/128 |
| 2006/0048643 A1 * | 3/2006 | Mohlmann ..................... 91/444 |
| 2011/0010063 A1 * | 1/2011 | Ota et al. ........................ 701/58 |

(Continued)

FOREIGN PATENT DOCUMENTS

| JP | 10-205615 | 8/1998 |
| JP | 2000-337488 A | 12/2000 |
| JP | 2011-27177 A | 2/2011 |

(Continued)

OTHER PUBLICATIONS

Office Action dated May 12, 2015, issued in corresponding Japanese application No. 2014-001967 (w/English translation) (6 pages).

*Primary Examiner* — Edwin A Young
(74) *Attorney, Agent, or Firm* — Westerman, Hattori, Daniels & Adrian, LLP

(57) ABSTRACT

An automatic transmission includes an input member, a planetary gear mechanism, a plurality of engagement mechanisms, an output member, a control unit, and a switching mechanism. The control unit is able to perform a backward preparation mode (step 3) which enables the rpm of an element fixed by the switching mechanism to be predetermined rpm or less by bringing the engagement mechanism into a connected state or a fixed state when the shift position is switched from a forward range to a backward range (step 1). The control unit switches the switching mechanism from a reverse-rotation preventing state to the fixed state (step 7) after the rpm of the element becomes the predetermined rpm or less (step 5) by performing the backward preparation mode.

3 Claims, 16 Drawing Sheets

(56) References Cited

U.S. PATENT DOCUMENTS

2011/0124463 A1* 5/2011 Sugino .......................... 475/296
2014/0038764 A1* 2/2014 Goleski ......................... 475/275

FOREIGN PATENT DOCUMENTS

JP          2011-208780 A    10/2011
JP          2012-97864 A      5/2012

* cited by examiner

FIG.4

| | B1 | B2 | B3 | B4 | C1 | C2 | C3 | TRANSMISSION GEAR RATIO | COMMON RATIO |
|---|---|---|---|---|---|---|---|---|---|
| Rvs | F | F | ○ | | | ○ | | 4.008 | |
| 1st | R/F | R/F | ○ | | | | | 5.233 | |
| 2nd | R | R/F | ○ | | | | ○ | 3.367 | 1.554 |
| 3rd | R | R/F | ○ | | | ○ | | 2.298 | 1.465 |
| 4th | R | R/F | | | | ○ | ○ | 1.705 | 1.348 |
| 5th | R | R/F | | | ○ | ○ | | 1.363 | 1.251 |
| 6th | R | R | | | ○ | ○ | ○ | 1.000 | 1.363 |
| 7th | R | R | ○ | | ○ | ○ | | 0.786 | 1.273 |
| 8th | R | R | ○ | | ○ | | ○ | 0.657 | 1.196 |
| 9th | R | R | ○ | ○ | ○ | | | 0.584 | 1.126 |
| 10th | R | R | | ○ | ○ | | ○ | 0.520 | 1.120 |

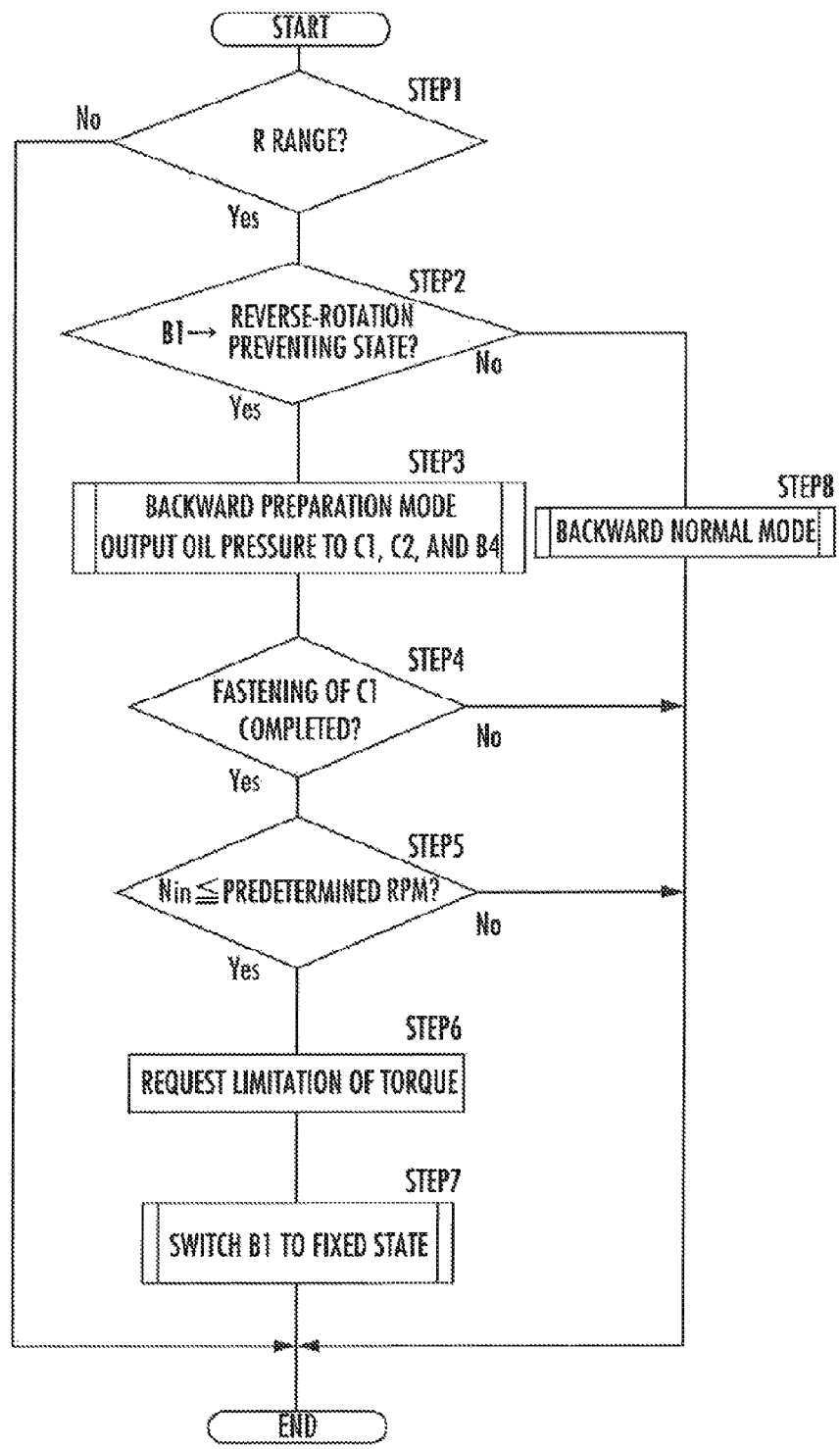

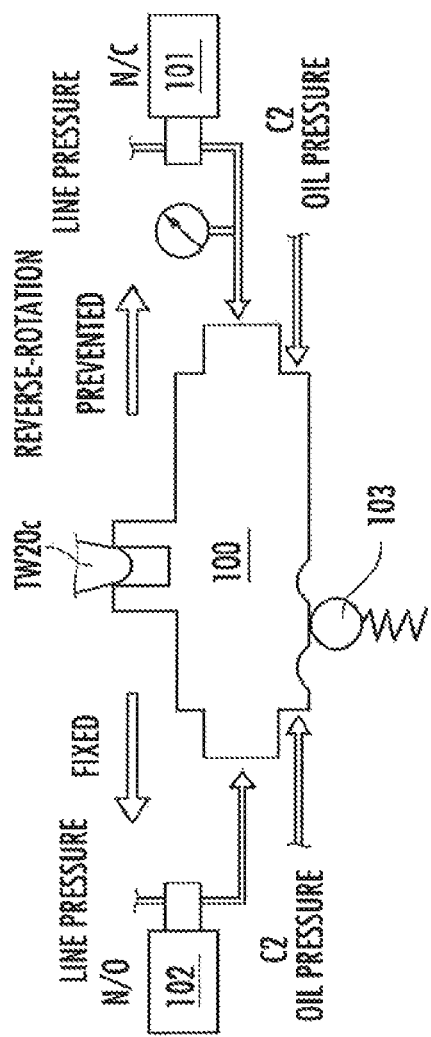

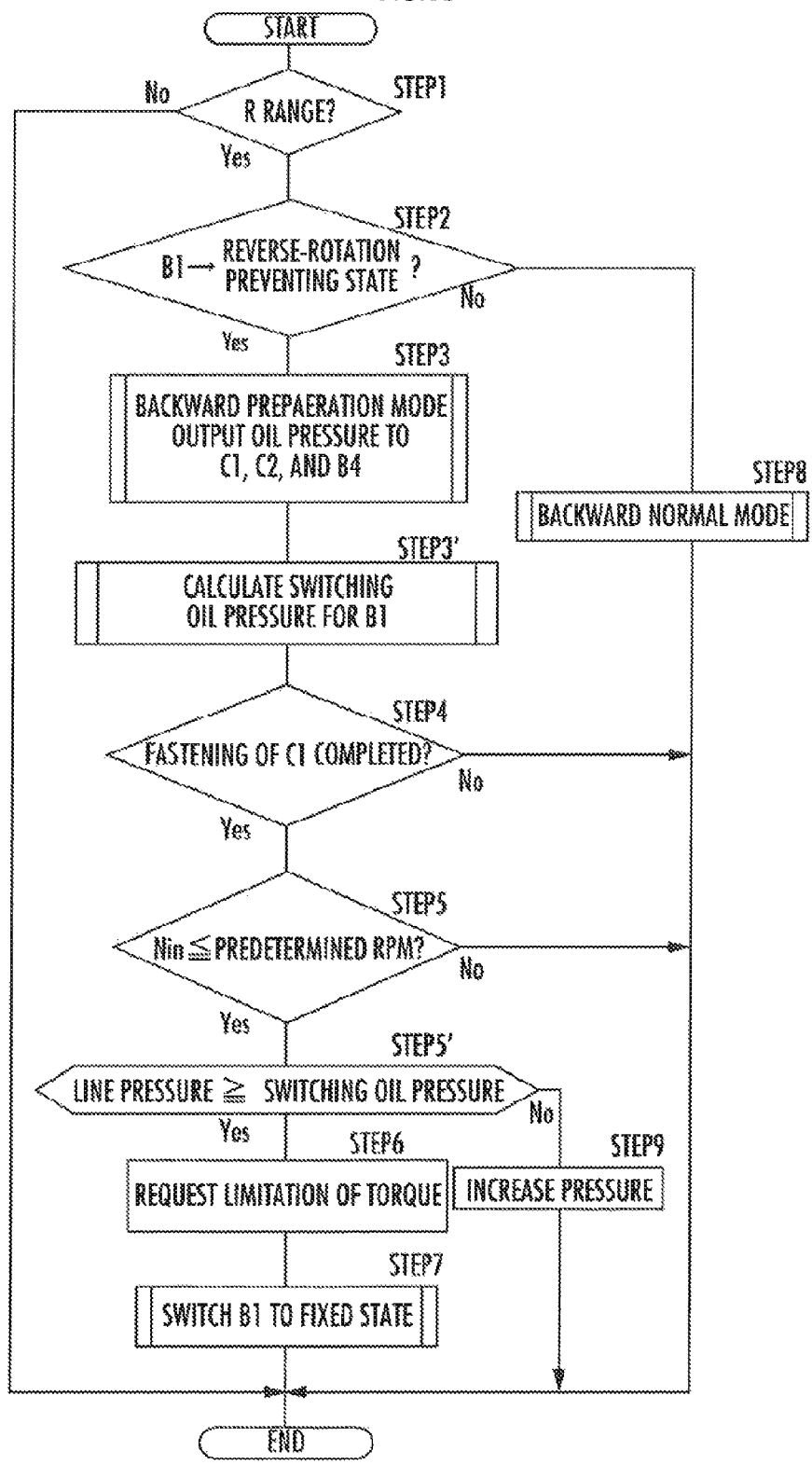

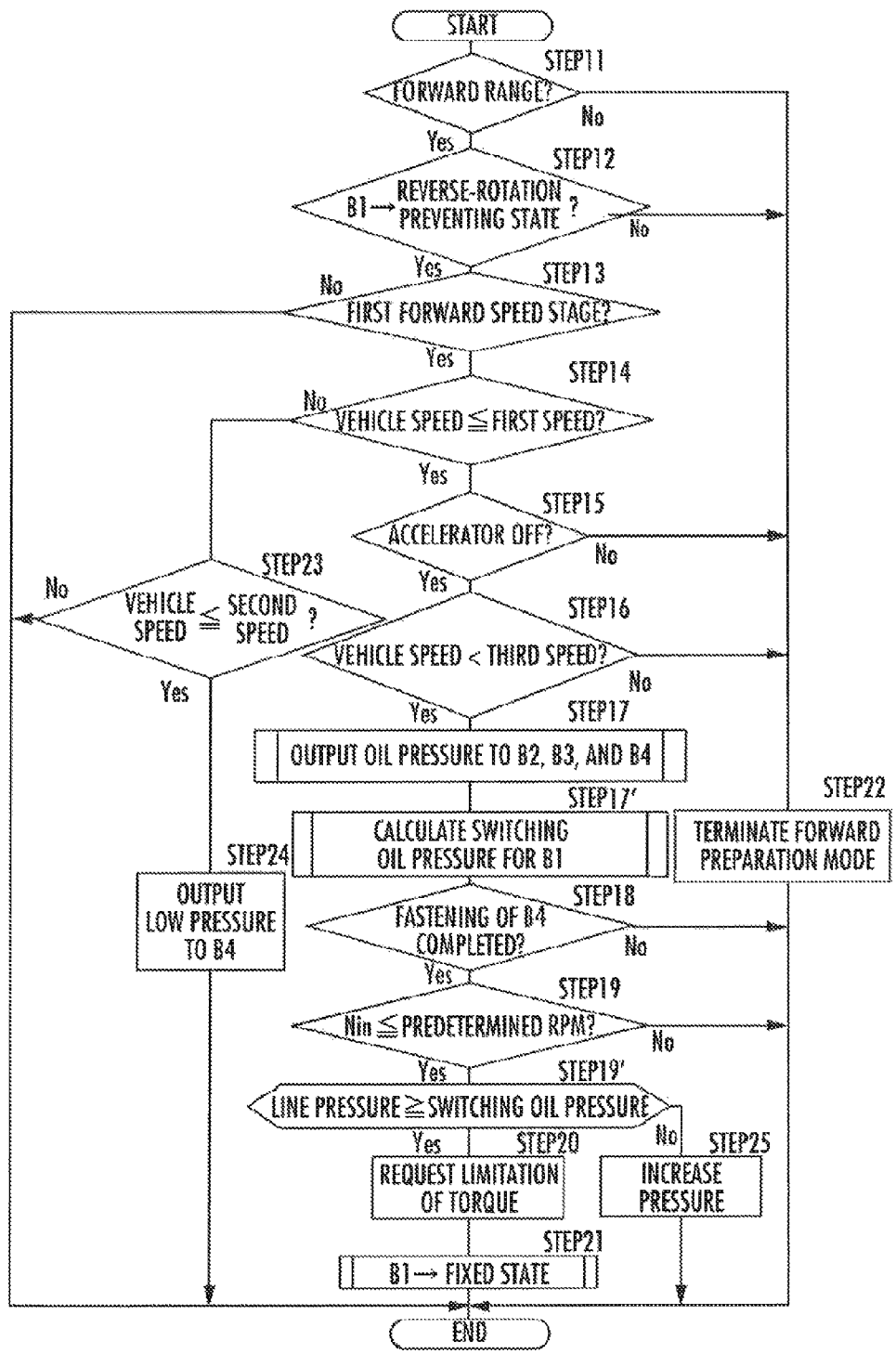

AUTOMATIC TRANSMISSION

BACKGROUND OF THE INVENTION

1. Field of the Invention

The present invention relates to an automatic transmission using a planetary gear mechanism.

2. Description of the Related Art

Conventionally, there is known an automatic transmission capable of providing shift transmission with eight forward speed stages and one backward speed stage using four planetary gear mechanisms and six engagement mechanisms including clutches and brakes (Refer to, for example, Japanese Patent Application Laid-Open No. 2012-97864, hereinafter Patent Document 1).

The automatic transmission in Patent Document 1 includes an input shaft rotatably supported in a housing and an output member including an output gear arranged coaxially with the input shaft. The rotation of the output member is transmitted to the right and left driving wheels of a vehicle through a differential gear or a propeller shaft.

Four first to fourth planetary gear mechanisms are arranged coaxially with the input shaft in the housing. The first planetary gear mechanism is a so-called single-pinion type planetary gear mechanism that includes three elements: a first sun gear, a first ring gear, and a first carrier supporting a first pinion meshing with the first sun gear and the first ring gear in such a way that it is rotatable about its axis and about the first sun gear (if the sun gear is rotated with the carrier fixed, the ring gear rotates in a different direction from the direction of the sun gear, and thus the planetary gear mechanism is also referred to as "minus planetary gear mechanism" or "negative planetary gear mechanism"; if the sun gear is rotated with the ring gear fixed, the carrier rotates in the same direction as the sun gear).

Assuming that three elements of the first planetary gear mechanism are defined as a first element, a second element, and a third element in sequence of a collinear diagram (a diagram which illustrates a ratio of relative rotation speeds of the three elements of the sun gear, the carrier, and the ring gear using straight lines [speed lines]) for the first planetary gear mechanism from one side, the first element is the first sun gear, the second element is the first carrier, and the third element is the first ring gear.

The second planetary gear mechanism is also a so-called single-pinion type planetary gear mechanism that includes a second sun gear, a second ring gear, and a second carrier supporting a second pinion meshing with the second sun gear and the second ring gear in such a way that it is rotatable about its axis and about the second sun gear. Assuming that three elements of the second planetary gear mechanism are defined as a fourth element, a fifth element, and a sixth element in sequence of a collinear diagram for the second planetary gear mechanism from one side, the fourth element is the second ring gear, the fifth element is the second carrier, and the sixth element is the second sun gear.

The third planetary gear mechanism is also a so-called single-pinion type planetary gear mechanism that includes a third sun gear, a third ring gear, and a third carrier supporting a third pinion meshing with the third sun gear and third ring gear in such a way that it is rotatable about its axis and about the third sun gear. Assuming that three elements of the third planetary gear mechanism are defined as a seventh element, an eighth element, and a ninth element in sequence of a collinear diagram for the third planetary gear mechanism from one side, the seventh element is the third sun gear, the eighth element is the third carrier, and the ninth element is the third ring gear.

The fourth planetary gear mechanism is also a single-pinion type planetary gear mechanism that includes a fourth sun gear, a fourth ring gear, and a fourth carrier supporting a fourth pinion meshing with the fourth sun gear and fourth ring gear in such a way that it is rotatable about its axis and about the fourth sun gear. Assuming that three elements of the fourth planetary gear mechanism are defined as a tenth element, a 11th element, and a 12th element in sequence of a collinear diagram for the fourth planetary gear mechanism from one side, the tenth element is the fourth ring gear, the 11th element is the fourth carrier, and the 12th element is the fourth sun gear.

The first sun gear (first element) in the first planetary gear mechanism is connected to the input shaft. The fourth ring gear (tenth element) in the fourth planetary gear mechanism is connected to the output member.

The first carrier (second element) in the first planetary gear mechanism, the second carrier (fifth element) in the second planetary gear mechanism, and the third ring gear (ninth element) in the third planetary gear mechanism are connected to each other, by which a first connected body (second element, fifth element, and ninth element) is formed. Further, the first ring gear (third element) in the first planetary gear mechanism and the fourth sun gear (12th element) in the fourth planetary gear mechanism are connected to each other, by which a second connected body (third element and 12th element) is formed. Furthermore, the third carrier (eighth element) in the third planetary gear mechanism and the fourth carrier (11th element) in the fourth planetary gear mechanism are connected to each other, by which a third connected body (eighth element and 11th element) is formed.

Moreover, the automatic transmission in Patent Document 1 has six engagement mechanisms, in total, including three first to third clutches and three first to third brakes.

The first clutch is a wet multi-plate clutch and is switchable between a connected state where the first sun gear (first element) in the first planetary gear mechanism is connected to the third connected body (eighth element and 11th element) and a release state where the connection is released. The second clutch is a wet multi-plate clutch and is switchable between a connected state where the first sun gear (first element) in the first planetary gear mechanism is connected to the second ring gear (fourth element) in the second planetary gear mechanism and a release state where the connection is released.

The third clutch is a wet multi-plate clutch and is switchable between a connected state where second sun gear (sixth element) in the second planetary gear mechanism is connected to the second connected body (third element and 12th element) and a release state where the connection is released. A first brake is a wet multi-plate brake and is switchable between a fixed state where the third connected body (eighth element and 11th element) is fixed to the housing and a release state where the fixing is released.

A second brake is a wet multi-plate brake and is switchable between a fixed state where the third sun gear (seventh element) in the third planetary gear mechanism is fixed to the housing and a release state where the fixing is released. The third brake is a wet multi-plate brake and is switchable between a fixed state where the second sun gear (sixth element) is fixed to the housing and a release state where the fixing is released.

In the automatic transmission in Patent Document 1, a first forward speed stage is established by placing the first, second, and third brakes in the fixed state. A second forward speed stage is established by placing the second and third brakes in the fixed state and placing the third clutch in the connected state. A third forward speed stage is established by placing the second and third brakes in the fixed state and the second clutch in the connected state. A fourth forward speed stage is established by placing the second brake in the fixed state and the second and third clutches in the connected state.

A fifth forward speed stage is established by placing the second brake in the fixed state and the first and second clutches in the connected state. A sixth forward speed stage is established by placing the three first to third clutches in the connected state. A seventh forward speed stage is established by placing the third brake in the fixed state and the first and second clutches in the connected state. An eighth forward speed stage is established by placing the third brake in the fixed state and the first and third clutches in the connected state. A backward stage is established by placing the first and third brakes in the fixed state and the second clutch in the connected state.

SUMMARY OF THE INVENTION

In the conventional automatic transmission, the first brake may include a two-way clutch as a switching mechanism. The switching mechanism including the two-way clutch may be switchable, for example, between a reverse-rotation preventing state where a normal rotation (a rotation in the same direction as the rotation direction of the input shaft) of the third connected body (eighth element and 11th element) is allowed and a reverse rotation (a rotation in the opposite direction to the rotation direction of the input shaft) is prevented and a fixed state where the third connected body (eighth element and 11th element) is fixed to the housing.

In the case where the first brake includes the switching mechanism as described above, the switching mechanism is brought into the reverse-rotation preventing state when a vehicle moves forward and in the fixed state when the vehicle moves backward. Then, when the shift position was switched from the backward range to the forward range by a driver's shift lever operation, the switching mechanism is switched from the fixed state to the reverse-rotation preventing. When the shift position was switched from the forward range to the backward range by a driver's shift lever operation, the switching mechanism is switched from the reverse-rotation preventing to the fixed state.

In the case where the switching mechanism is in the reverse-rotation preventing state, the third connected body (eighth element and 11th element) is able to rotate freely in the normal rotation direction. Therefore, if the switching mechanism is switched from the reverse-rotation preventing state to the fixed state with the third connected body (eighth element and 11th element) rotating in the normal rotation direction, the rotation of the third connected body (eighth element and 11th element) is stopped suddenly, which generates a relatively loud switching sound and thereby might provide an uncomfortable feeling to the passenger of the vehicle.

To prevent the above, it is also possible to switch the switching mechanism from the reverse-rotation preventing state to the fixed state after the rotation speed of the third connected body (eighth element and 11th element) is sufficiently lowered. This, however, causes a problem of requiring too much time for switching the switching mechanism.

Although the aforementioned structure of the automatic transmission is an example, the problem of the switching sound of the switching mechanism might occur in all automatic transmissions in which the state of the switching mechanism is switched at the time of switching between the forward and backward movements.

In view of the above problem described above, it is an object of the present invention to provide an automatic transmission capable of switching a switching mechanism rapidly and preventing an occurrence of a switching sound.

[1] To achieve the above object, according to a first aspect of the present invention, there is provided an automatic transmission including: an input member which is arranged in a housing and to which motive power of a drive source is transmitted; a planetary gear mechanism having a plurality of elements rotatable in the housing; a plurality of engagement mechanisms switchable to a connected state where the elements are connected to each other or to a fixed state where the elements are fixed to the housing; an output member; and a control unit which controls the engagement mechanisms, the automatic transmission capable of shifting rotation of the input member in multiple stages and freely outputting the rotation from the output member and further including: a switching mechanism switchable between a reverse-rotation preventing state where a normal rotation by which a vehicle runs in a forward direction is allowed and a reverse rotation by which the vehicle runs in a backward direction is prevented with respect to one of the plurality of elements and a fixed state where the element is fixed to the housing, wherein the control unit brings the switching mechanism into the reverse-rotation preventing state when a shift position is in a forward range and brings the switching mechanism into the fixed state when the shift position is in a backward range, wherein the control unit is able to perform a backward preparation mode which enables a rpm (rotation per minute) of the element fixed by the switching mechanism to be a predetermined rpm or less by bringing the engagement mechanism into the connected state or the fixed state when the shift position is switched from the forward range to the backward range, and wherein the control unit switches the switching mechanism from the reverse-rotation preventing state to the fixed state after the rpm of the element becomes the predetermined rpm or less by performing the backward preparation mode.

According to the first aspect of the present invention, the backward preparation mode is performed to cause the rpm of the element fixed by the switching mechanism to be the predetermined rpm or less by bringing the engagement mechanism into the connected state or the fixed state, thereby enabling the switching mechanism to be switched rapidly and the generation of a switching sound to be suppressed.

[2] In this respect, whether the rpm of the element fixed by the switching mechanism is the predetermined rpm or less in the backward preparation mode can be determined by providing an rpm detection unit such as an rpm sensor. This, however, requires the provision of the rpm detection unit, which increases the number of parts and increases the cost.

Accordingly, in the first aspect of the present invention, the automatic transmission may include an oil-temperature detection unit which detects oil temperature and a vehicle speed detection unit which detects running speed of a vehicle, and the control unit may set a predetermined time period according to the oil temperature detected by the oil-temperature detection unit and the vehicle speed detected by the vehicle speed detection unit and may determine whether the rpm of the element is the predetermined rpm or less based on whether the predetermined time period has elapsed.

According to the above configuration, there is no need to provide the rpm detection unit which detects the rpm of the element fixed by the switching mechanism separately, thereby preventing an increase in the number of parts and preventing an increase in cost.

[3] According to a second aspect of the present invention, there is provided an automatic transmission including: an input member which is arranged in a housing and to which motive power of a drive source is transmitted; a planetary gear mechanism having a plurality of elements rotatable in the housing; a plurality of engagement mechanisms switchable to a connected state where the elements are connected to each other or to a fixed state where the elements are fixed to the housing; an output member; and a control unit which controls the engagement mechanisms, the automatic transmission capable of shifting rotation of the input member in multiple stages and freely outputting the rotation from the output member and further including: a switching mechanism switchable between a reverse-rotation preventing state where a normal rotation by which a vehicle runs in a forward direction is allowed and a reverse rotation by which the vehicle runs in a backward direction is prevented with respect to one of the plurality of elements and a fixed state where the element is fixed to the housing; and a vehicle speed detection unit which detects a running speed of the vehicle, wherein the control unit brings the switching mechanism into the reverse-rotation preventing state when a shift position is in a forward range and brings the switching mechanism into the fixed state when the shift position is in a backward range, wherein the control unit has a forward preparation mode which enables a rpm of the element fixed by the switching mechanism to be a predetermined rpm or less by bringing the engagement mechanism into the connected state or the fixed state when the shift position is in the forward range and in the case where the vehicle speed detected by the vehicle speed detection unit is under predetermined first speed and where a low speed stage which is the lowest in speed among the multiple speed stages is established, and wherein the control unit switches the switching mechanism from the fixed state to the reverse-rotation preventing state after the rpm of the element becomes the predetermined rpm or less in the forward preparation mode.

In the first aspect of the present invention, a shift to a backward in-gear state can be rapidly performed in comparison with the case of waiting until the rpm of the element fixed by the switching mechanism becomes the predetermined rpm or less. In the first aspect of the present invention, however, the shift to the backward in-gear state cannot be performed until the completion of the backward preparation mode after the backward range is selected.

According to the second aspect of the present invention, the forward preparation mode is performed during the forward range to switch the switching mechanism from the reverse-rotation preventing state to the fixed state. Therefore, immediately after switching from the forward range to the backward range, the automatic transmission is able to shift to the backward in-gear state, thereby preventing the generation of a switching sound of the switching mechanism and further improving the running response in the backward range.

[4] Moreover, according to the second aspect of the present invention, preferably the engagement mechanism is of an oil pressure operation type, and the control unit supplies standby oil pressure to the engagement mechanism brought into the connected state or the fixed state in the forward preparation mode when the shift position is in the forward range and in the case where the vehicle speed detected by the vehicle speed detection unit is a predetermined second speed or lower and where a low speed stage which is the lowest in speed among the multiple speed stages is established.

According to the above configuration, the forward preparation mode can be rapidly completed by supplying the standby oil pressure to the engagement mechanism.

[5] In the second aspect of the present invention, the forward preparation mode is performed in the forward range, and therefore there might be a case where the vehicle starts up again without a shift to the backward range. Accordingly, the control unit preferably terminates the forward preparation mode in the case where the vehicle speed detected by the vehicle speed detection unit is equal to or higher than a predetermined third speed which is set to a speed higher than the first speed or where the accelerator opening degree detected by the accelerator opening degree detection unit is a predetermined opening degree or more. This enables the vehicle to start up again smoothly.

[6] Moreover, the present invention may include a hydraulic control circuit, and the hydraulic control circuit may include an oil-pressure detection unit which detects a line pressure, an oil-pressure regulating unit which regulates the line pressure, and a slider movable by the line pressure supplied thereto. The switching mechanism may be switched into the reverse-rotation preventing state or the fixed state by the movement of the slider and the control unit may increase the line pressure by using the oil-pressure regulating unit in the case where the line pressure detected by the oil-pressure detection unit is less than pressure necessary to switch the switching mechanism to the reverse-rotation preventing state or the fixed state.

According to the above configuration, the state of the switching mechanism can be appropriately switched by using the line pressure.

[7] Furthermore, according to a third aspect of the present invention, there is provided an automatic transmission including: an input member which is arranged in a housing and to which motive power of a drive source is transmitted; a planetary gear mechanism having a plurality of elements rotatable in the housing; a plurality of engagement mechanisms switchable to a connected state where the elements are connected to each other or to a fixed state where the elements are fixed to the housing; an output member; and a control unit which controls the engagement mechanisms, the automatic transmission capable of shifting rotation of the input member in multiple stages and freely outputting the rotation from the output member and further including: a switching mechanism switchable between a reverse-rotation preventing state where a normal rotation by which a vehicle runs in a forward direction is allowed and a reverse rotation by which the vehicle runs in a backward direction is prevented with respect to one of the plurality of elements and a fixed state where the element is fixed to the housing; and a vehicle speed detection unit which detects a running speed of the vehicle, wherein the control unit brings the switching mechanism into the reverse-rotation preventing state when a shift position is in a forward range and brings the switching mechanism into the fixed state when the shift position is in a backward range, wherein the control unit is able to perform a backward preparation mode which enables a rpm of the element fixed by the switching mechanism to be a predetermined rpm or less by bringing the engagement mechanism into the connected state or the fixed state when the shift position is switched from the forward range to the backward range, wherein the control unit is able to perform a forward preparation mode which enables the rpm of the element fixed by the switching mechanism to be the predetermined rpm or less by bringing the engagement mechanism into the connected state or the fixed state when the shift position is in the forward range and in the case where the vehicle speed detected by the vehicle speed detection unit is a predetermined first speed or lower and where a low speed stage which is the lowest in speed among the multiple speed stages is established, and wherein the control unit stops the forward preparation mode and performs the backward preparation mode used when the shift position is in the backward range in the case where switching of the shift position from the forward range to the neutral range is detected before the rpm of the element becomes the predetermined rpm or less during execution of the forward preparation mode.

BRIEF DESCRIPTION OF THE DRAWINGS

FIG. 4 is an explanatory diagram illustrating a state of an engagement mechanism in each variable speed stage of the automatic transmission of the present embodiment;

FIG. 6 is a flowchart illustrating processing in a backward preparation mode of the present embodiment;

FIG. 14 is an explanatory diagram illustrating a switching mechanism of another embodiment;

FIG. 15 is a flowchart illustrating processing in the backward preparation mode of another embodiment; and FIG. 16 is a flowchart illustrating processing in the forward preparation mode of another embodiment.

DESCRIPTION OF THE PREFERRED EMBODIMENTS

Figure 1:
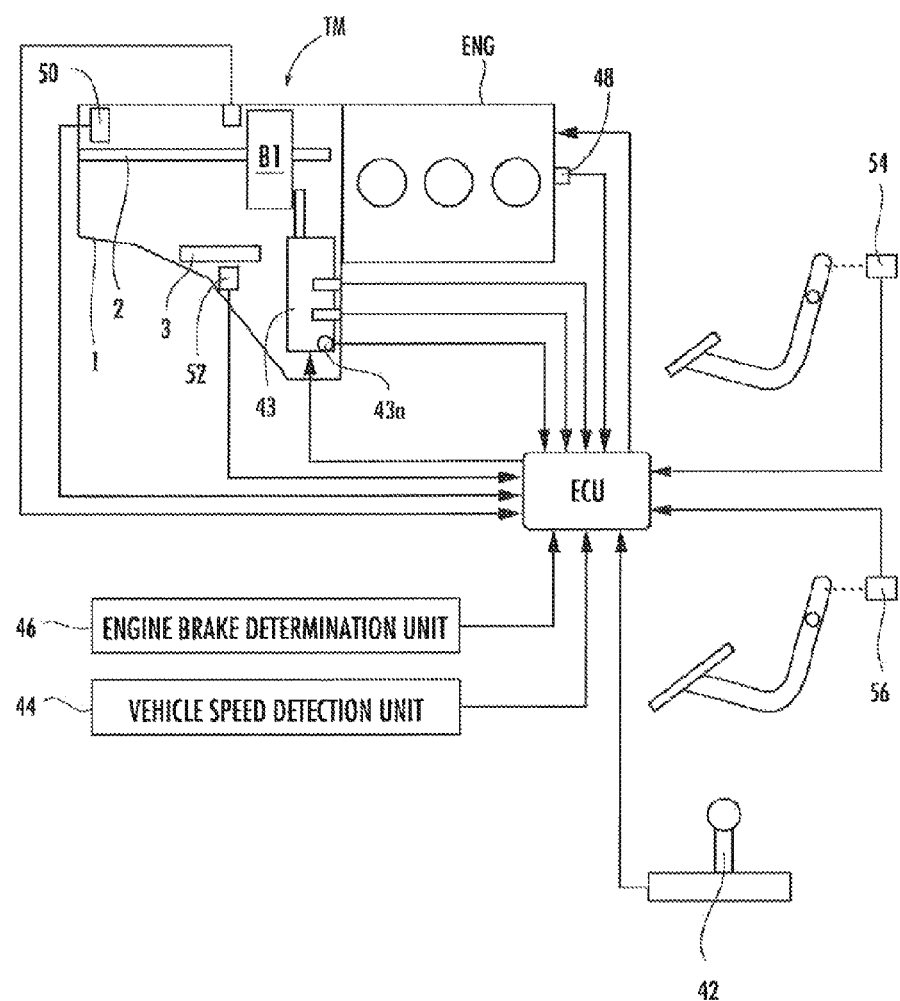
FIG. 1 is an explanatory diagram schematically illustrating an embodiment of an automatic transmission of the present invention.
Figure 2:
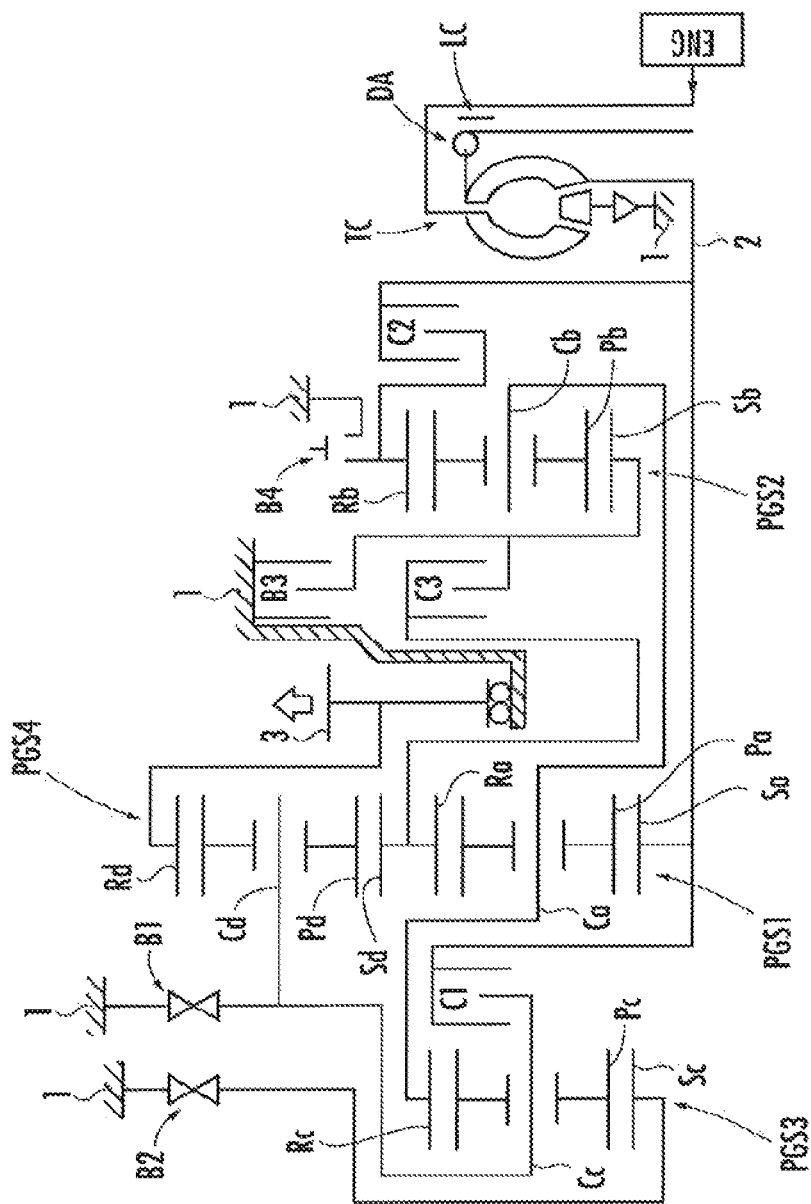
FIG. 2 is a skeleton diagram illustrating an embodiment of the automatic transmission of the present invention.

FIG. 1 schematically illustrates an embodiment of an automatic transmission TM of the present invention. FIG. 2 is a skeleton diagram illustrating the automatic transmission TM of the present embodiment. The automatic transmission TM includes an input shaft 2 rotatably supported in a transmission case 1 as a housing and an output member 3 including an output gear arranged coaxially with the input shaft 2. The input shaft 2 is an input member configured to receive a driving force output from a drive source ENG such as an internal combustion (engine), which is not illustrated, through a torque converter TC having a lockup clutch LC and a damper DA.

The rotation of the output member 3 is transmitted to the right and left driving wheels of a vehicle through a differential gear and a propeller shaft which is not illustrated. A single-plate or multi-plate type start clutch configured to be free to frictionally engage may be provided instead of the torque converter TC.

In the transmission case 1 as a housing, four first to fourth planetary gear mechanisms PGS1 to PGS4 are arranged coaxially with the input shaft 2. The first planetary gear mechanism PGS1 is a so-called single-pinion type planetary gear mechanism that includes a sun gear Sa, a ring gear Ra, and a carrier Ca supporting a pinion Pa meshing with the sun gear Sa and ring gear Ra in such a way that it is rotatable about its axis and about the sun gear Sa (the single-pinion type planetary gear mechanism is also referred to as a minus planetary gear mechanism or a negative planetary gear mechanism because, when the sun gear is rotated with the carrier fixed, the ring gear rotates in a different direction from the sun gear. When the sun gear is rotated with the ring gear fixed, the carrier rotates in the same direction as the sun gear).

Figure 3:
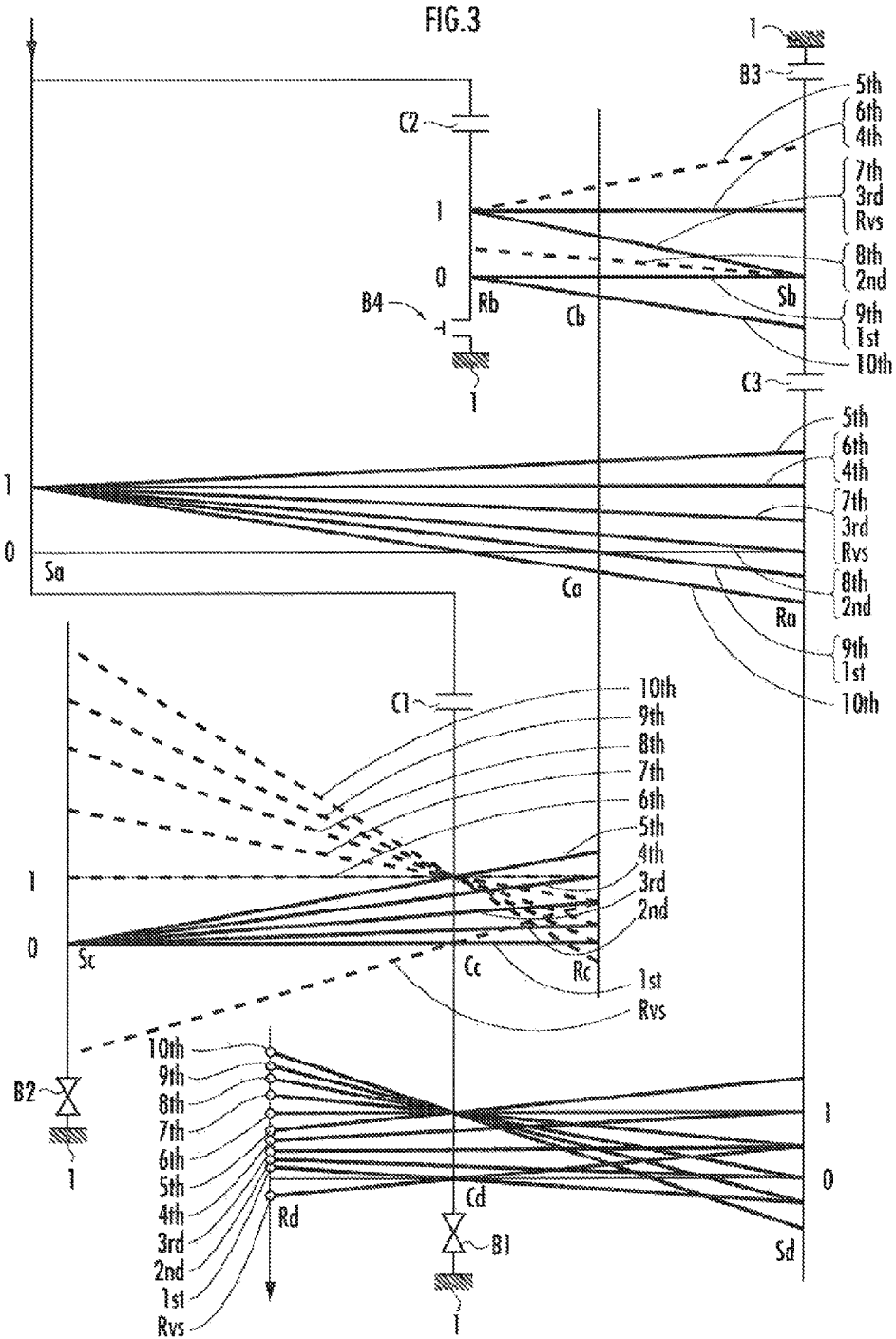
FIG. 3 is a collinear diagram of the automatic transmission of the present embodiment.

Referring to the collinear diagram (diagram that illustrates a ratio among relative rotation speeds of the three elements, which are the sun gear, the carrier, and the ring gear, using straight lines [speed lines]) for the first planetary gear mechanism PGS1 illustrated in the second stage from the top in FIG. 3, when the three elements Sa, Ca, and Ra of the first planetary gear mechanism PGS1 are arranged at intervals corresponding to the gear ratio (the number of teeth of the ring gear/the number of teeth of the sun gear) in the collinear diagram and they are defined as a first element, a second element, and a third element in sequence from the left, the first element is the sun gear Sa, the second element is the carrier Ca, and the third element is the ring gear Ra.

Here, the ratio of the interval between the sun gear Sa and carrier Ca to the interval between the carrier Ca and ring gear Ra is set at h:1, where h represents the gear ratio of the first planetary gear mechanism PGS1. In the collinear diagram, the lower horizontal line (4th) indicates that the rotation speed is "0," and the upper horizontal line (6th) indicates that the rotation speed is "1," which is the same as the rotation speed of the input shaft 2.

The second planetary gear mechanism PGS2 is also a so-called single-pinion type planetary gear mechanism that includes a sun gear Sb, a ring gear Rb, and a carrier Cb supporting a pinion Pb meshing with the sun gear Sb and ring gear Rb in such a way that it is rotatable about its axis and about the sun gear Sb.

Referring to the collinear diagram for the second planetary gear mechanism PGS2 illustrated in the first stage from the top (the top stage) in FIG. 3, when the three elements Sb, Cb, and Rb of the second planetary gear mechanism PGS2 are arranged at intervals corresponding to the gear ratio in the collinear diagram and they are defined as a fourth element, a fifth element, and a sixth element in sequence from the left, the fourth element is the ring gear Rb, the fifth element is the carrier Cb, and the sixth element is the sun gear Sb. The ratio of the interval between the sun gear Sb and carrier Cb to the interval between the carrier Cb and ring gear Rb is set at i:1, where i represents the gear ratio of the second planetary gear mechanism PGS2.

The third planetary gear mechanism PGS3 is also a single-pinion type planetary gear mechanism that includes a sun gear Sc, a ring gear Rc, and a carrier Cc supporting a pinion Pc meshing with the sun gear Sc and ring gear Rc in such a way that it is rotatable about its axis and about the sun gear Sc.

Referring to the collinear diagram for the third planetary gear mechanism PGS3 illustrated in the third stage from the top in FIG. 3, when the three elements Sc, Cc, and Rc of the third planetary gear mechanism PGS3 are arranged at intervals corresponding to the gear ratio in the collinear diagram and they are defined as a seventh element, an eighth element, and a ninth element in sequence from the left, the seventh element is the sun gear Sc, the eighth element is the carrier Cc, and the ninth element is the ring gear Rc. The ratio of the interval between the sun gear Sc and carrier Cc to the interval between the carrier Cc and ring gear Rc is set at j:1, where j represents the gear ratio of the third planetary gear mechanism PGS3.

The fourth planetary gear mechanism PGS4 is also a single-pinion type planetary gear mechanism that includes a sun gear Sd, a ring gear Rd, and a carrier Cd supporting a pinion Pd meshing with the sun gear Sd and ring gear Rd in such a way that it is rotatable about its axis and about the sun gear Sd.

Referring to the collinear diagram for the fourth planetary gear mechanism PGS4 illustrated in the fourth stage from the top (the bottom stage) in FIG. 3, when the three elements Sd, Cd, and Rd of the fourth planetary gear mechanism PGS4 are arranged at intervals corresponding to the gear ratio in the collinear diagram and they are defined as a tenth element, a 11th element, and a 12th element in sequence from the left, the tenth element is the ring gear Rd, the 11th element is the carrier Cd, and the 12th element is the sun gear Sd. The ratio of the interval between the sun gear Sd and carrier Cd to the interval between the carrier Cd and ring gear Rd is set at k:1, where k represents the gear ratio of the fourth planetary gear mechanism PGS4.

The sun gear Sa (first element) in the first planetary gear mechanism PGS1 is connected to the input shaft 2. The ring gear Rd (tenth element) in the fourth planetary gear mechanism PGS4 is connected to the output member 3 composed of the output gear.

Moreover, a first connected body Ca-Cb-Rc is formed by connecting the carrier Ca (second element) in the first planetary gear mechanism PGS1, the carrier Cb (fifth element) in the second planetary gear mechanism PGS2, and the ring gear Rc (ninth element) in the third planetary gear mechanism PGS3. Further, a second connected body Ra-Sd is formed by connecting the ring gear Ra (third element) in the first planetary gear mechanism PGS1 and the sun gear Sd (12th element) in the fourth planetary gear mechanism PGS4. Still further, a third connected body Cc-Cd is formed by connecting the carrier Cc (eighth element) in the third planetary gear mechanism PGS3 and the carrier Cd (11th element) in the fourth planetary gear mechanism PGS4.

The automatic transmission according to the embodiment includes seven engagement mechanisms, which are composed of three clutches (first to third clutches C1 to C3) and four brakes (first to fourth brakes B1 to B4).

The first clutch C1 is a wet multi-plate clutch of an oil pressure operation type and is switchable between a connected state where the sun gear Sa (first element) in the first planetary gear mechanism PGS1 is connected to the third connected body Cc-Cd and a release state where the connection is released. The second clutch C2 is a wet multi-plate clutch of an oil pressure operation type and is switchable between a connected state where the sun gear Sa (first element) in the first planetary gear mechanism PGS1 is connected to the ring gear Rb (fourth element) in the second planetary gear mechanism PGS2 and a release state where the connection is released.

The third clutch C3 is a wet multi-plate clutch of an oil pressure operation type and is switchable between a connected state where the sun gear Sb (sixth element) in the second planetary gear mechanism PGS2 is connected to the second connected body Ra-Sd and a release state where the connection is released. The first brake B1 is a two-way clutch and is switchable between a reverse-rotation preventing state where the normal rotation (rotation in the same direction as the rotation direction of the input shaft 2) of the third connected body Cc-Cd is allowed and a reverse rotation thereof is prevented and a fixed state where the third connected body Cc-Cd is fixed to the transmission case 1.

The first brake B1, which is a two-way clutch, in the reverse-rotation preventing state is brought into a release state when a force for rotating in the normal direction is applied to the third connected body Cc-Cd, because the rotation is allowed. When a force for rotating in the reverse rotation direction, the rotation is prevented and the first brake B1 is brought into a fixed state where the first brake B1 is fixed to the transmission case 1. In this embodiment, the first brake B1 including the two-way clutch corresponds to a switching mechanism according to the present invention.

A second brake B2 is a two-way clutch and is switchable between a normal-rotation preventing state where a normal rotation of the sun gear Sc (seventh element) in the third planetary gear mechanism PGS3 is prevented and a reverse-rotation preventing state where the sun gear Sc (seventh element) in the third planetary gear mechanism PGS3 is prevented.

The second brake B2, which is a two-way clutch, in the normal-rotation preventing state is brought into a fixed state where the second brake B2 is fixed to the transmission case 1 when a force for rotating in the normal direction is applied to the sun gear Sc (seventh element) in the third planetary gear mechanism PGS3, because the rotation is prevented. When a force for rotating in the reverse rotation direction is applied to the sun gear Sc, the rotation is allowed and the second brake B2 is brought into a release state.

By contraries, the second brake B2 including the two-way clutch in the reverse-rotation preventing state is brought into a release state when a force for rotating in the normal direction is applied to the sun gear Sc (seventh element) in the third planetary gear mechanism PGS3, because the rotation is allowed. When a force for rotating in the reverse rotation is applied to the sun gear Sc, the rotation is prevented and the second brake B2 is brought into a fixed state where the second brake B2 is fixed to the transmission case 1. Alternatively, the second brake B2 may be a wet multi-plate brake of an oil pressure operation type.

A third brake B3 is a wet multi-plate brake of an oil pressure operation type and is switchable between a fixed state where the sun gear Sb (sixth element) of the second planetary gear mechanism PGS2 is fixed to the transmission case 1 and a release state where the fixing is released. A fourth brake B4 is a meshing mechanism including a dog clutch or a synchro-mesh mechanism having a synchronizing function and is switchable between a fixed state where the ring gear Rb (fourth element) in the second planetary gear mechanism PGS2 is fixed to the transmission case 1 and a release state where the fixing is released.

The state of each of the clutches C1 to C3 and brakes B1 to B4 is switched by a control unit ECU including a transmission control unit (TCU) illustrated in FIG. 1 on the basis of vehicle information such as a running speed of a vehicle.

On the axis line of the input shaft 2, the second clutch C2, the second planetary gear mechanism PGS2, the third clutch C3, the output member 3, the first planetary gear mechanism PGS1, the first clutch C1, and the third planetary gear mechanism PGS3 are arranged in this order from the side of the drive source ENG and torque converter TC.

Moreover, the fourth brake B4 is arranged in a radial outer portion of the second planetary gear mechanism PGS2, the third brake B3 is arranged in a radial outer portion of the third clutch C3, the first brake B1 is arranged in a radial outer portion of the first clutch C1, and the second brake B2 is arranged in a radial outer portion of the third planetary gear mechanism PGS3. This arrangement of the four brakes B1 to B4 in the radial outer portion of the planetary gear mechanism or the respective clutches enables a reduction in the shaft length of the automatic transmission in comparison with the case where the brakes B1 to B4 are arranged on the axis line of the input shaft 2 along with the planetary gear mechanism and the clutches. Alternatively, the fourth brake B4 may be arranged in a radial outer portion of the second clutch C2 and the third brake B3 may be arranged in a radial outer portion of the second planetary gear mechanism PGS2.

Moreover, the fourth planetary gear mechanism PGS4 is arrange in a radial outer portion of the first planetary gear mechanism PGS1. Further, the second connected body Ra-Sd is formed by integrally connecting the ring gear Ra (third element) in the first planetary gear mechanism PGS1 and the sun gear Sd (12th element) in the fourth planetary gear mechanism PGS4. This arrangement of the fourth planetary gear mechanism PGS4 in the radial outer portion of the first planetary gear mechanism PGS1 causes the first planetary gear mechanism PGS1 and the fourth planetary gear mechanism PGS4 to overlap each other in the radial direction, thereby enabling a reduction in the shaft length of the automatic transmission.

The first planetary gear mechanism PGS1 and the fourth planetary gear mechanism PGS4 only need to at least partially overlap each other in the radial direction, thereby enabling a reduction in the shaft length. If both completely overlap each other in the radial direction, however, the shortest shaft length is achieved.

The following describes a case of establishing each variable speed stage of the automatic transmission according to the embodiment with reference to FIGS. 3 and 4.

To establish a first speed stage, the first brake B1 and the second brake B2, each of which is a two-way clutch, are brought into the reverse-rotation preventing state and the third brake B3 is brought into a fixed state. The reverse-rotation preventing state of the first brake B1 and the second brake B2 causes the reverse rotation of the third connected body Cc-Cd and the sun gear Sc (seventh element) in the third planetary gear mechanism PGS3 to be prevented and causes the rotation speed of the third connected body Cc-Cd and the sun gear Sc (seventh element) in third planetary gear mechanism PGS3 to be "0."

This causes the three (seventh to ninth) elements Sc, Cc, and Rc in the third planetary gear mechanism PGS3 to be in a locked state where relative rotation thereof is disabled and causes the rotation speed of the first connected body Ca-Cb-Rc including the ring gear Rc (ninth element) in the third planetary gear mechanism PGS3 to be "0." Then, the ring gear Rd (tenth element) in the fourth planetary gear mechanism PGS4, to which the output member 3 is connected, is set to "1st" illustrated in FIG. 3 and the first speed stage is established.

Although there is no need to bring the third brake B3 into a fixed state in order to establish the first speed stage, the third brake B3 is placed in the fixed state in the first speed stage so as to enable the shift transmission to be smoothly performed from the first speed stage to a second speed stage described later. Moreover, to enable an engine brake in the first speed stage, the first brake B1 and the second brake B2, each of which is a two-way clutch, may be switched to the normal-rotation preventing state.

To establish the second speed stage, the first brake B1 and the second brake B2, each of which is a two-way clutch, are brought into the reverse-rotation preventing state, the third brake B3 is brought into the fixed state, and the third clutch C3 is brought into the connected state. The reverse-rotation preventing state of the first brake B1 causes the normal rotation of the third connected body Cc-Cd to be allowed. Moreover, the reverse-rotation preventing state of the second brake B2 causes the rotation speed of the sun gear Sc (seventh element) in the third planetary gear mechanism PGS3 to be "0." Furthermore, the fixed state of the third brake B3 causes the rotation speed of the sun gear Sb (sixth element) in the second planetary gear mechanism PGS2 to be "0."

Moreover, the connected state of the third clutch C3 causes the rotation speed of the second connected body Ra-Sd to be "0," which is the same as the rotation speed of the sun gear Sb (sixth element) in the second planetary gear mechanism PGS2. Then, the rotation speed of the ring gear Rd (tenth element) in the fourth planetary gear mechanism PGS4, to which the output member 3 is connected, is set to "2nd" illustrated in FIG. 3 and the second speed stage is established. To enable the engine brake in the second speed stage, the second brake B2 including the two-way clutch may be switched to the normal-rotation preventing state.

To establish a third speed stage, the first brake B1 and the second brake B2, each of which is a two-way clutch, are brought into the reverse-rotation preventing state, the third brake B3 is brought into the fixed state, and the second clutch C2 is brought into the connected state. The reverse-rotation preventing state of the first brake B1 causes the normal rotation of the third connected body Cc-Cd to be allowed. Moreover, the reverse-rotation preventing state of the second brake B2 causes the rotation speed of the sun gear Sc (seventh element) in the third planetary gear mechanism PGS3 to be "0." Furthermore, the fixed state of the third brake B3 causes the rotation speed of the sun gear Sb (sixth element) in the second planetary gear mechanism PGS2 to be "0."

Moreover, the connected state of the second clutch C2 causes the rotation speed of the ring gear Rb (fourth element) in the second planetary gear mechanism PGS2 to be "1," which is the same as the rotation speed of the sun gear Sa (first element) in the first planetary gear mechanism PGS1 connected to the input shaft 2. The rotation speed of the sun gear Sb (sixth element) in the second planetary gear mechanism PGS2 is set to "0" and the rotation speed of the ring gear Rb (fourth element) is set to "1," and therefore the rotation speed of the carrier Cb (fifth element), namely the rotation speed of the first connected body C1-Cb-Rc is set to "i/(i+1)."

Then, the rotation speed of the ring gear Rd (tenth element) in the fourth planetary gear mechanism PGS4, to which the output member 3 is connected, is set to "3rd" illustrated in FIG. 3 and the third speed stage is established. To enable the engine brake in the third speed stage, the second brake B2 including the two-way clutch may be switched to the normal-rotation preventing state.

To establish a fourth speed stage, the first brake B1 and the second brake B2, each of which is a two-way clutch, are brought into the reverse-rotation preventing state and the second clutch C2 and the third clutch C3 are brought into the connected state. The reverse-rotation preventing state of the first brake B1 causes the normal rotation of the third connected body Cc-Cd to be allowed. Moreover, the reverse-rotation preventing state of the second brake B2 causes the rotation speed of the sun gear Sc (seventh element) in the third planetary gear mechanism PGS3 to be "0."

Moreover, the connected state of the third clutch C3 causes the sun gear Sb (sixth element) in the second planetary gear mechanism PGS2 and the second connected body Ra-Sd to rotate at the same speed. This causes a connection between the carrier Ca (second element) in the first planetary gear mechanism PGS1 and the carrier Cb (fifth element) in the second planetary gear mechanism PGS2, by which the ring gear Ra (third element) is connected to the sun gear Sb (sixth element). Thereby, in the fourth speed stage where the third clutch C3 is in the connected state, there is illustrated a collinear diagram including four elements in the first planetary gear mechanism PGS1 and the second planetary gear mechanism PGS2.

Then, the connected state of the second clutch C2 causes the rotation speed of the ring gear Rb (fourth element) in the second planetary gear mechanism PGS2 to be "1," which is the same as the rotation speed of the sun gear Sa (first element) in the first planetary gear mechanism PGS1, and causes the rotation speeds of two elements among four elements of the first planetary gear mechanism PGS1 and the second planetary gear mechanism PGS2 to be the same speed "1."

This causes the respective elements of the first planetary gear mechanism PGS1 and the second planetary gear mechanism PGS2 to be in a locked state where relative rotation thereof is disabled and causes the rotation speeds of all elements of the first planetary gear mechanism PGS1 and the second planetary gear mechanism PGS2 to be "1." Then, the rotation speed of the third connected body Cc-Cd is set to j/(j+1) and the rotation speed of the ring gear Rd (tenth element) in the fourth planetary gear mechanism PGS4, to which the output member 3 is connected, is set to "4th" illustrated in FIG. 3 and the fourth speed stage is established. To enable the engine brake in the fourth speed stage, the second brake B2 including the two-way clutch may be switched to the normal-rotation preventing state.

To establish a fifth speed stage, the first brake B1 and the second brake B2, each of which is a two-way clutch, are brought into the reverse-rotation preventing state and the first clutch C1 and the second clutch C2 are brought into the connected state. The reverse-rotation preventing state of the first brake B1 causes the normal rotation of the third connected body Cc-Cd to be allowed. Moreover, the reverse-rotation preventing state of the second brake B2 causes the rotation speed of the sun gear Sc (seventh element) in the third planetary gear mechanism PGS3 to be "0."

Moreover, the connected state of the first clutch C1 causes the rotation speed of the third connected body Cc-Cd to be "1," which is the same as the rotation speed of the sun gear Sa (first element) in the first planetary gear mechanism PGS1. Then, the rotation speed of the ring gear Rd (tenth element) in the fourth planetary gear mechanism PGS4, to which the output member 3 is connected, is set to "5th" illustrated in FIG. 3 and the fifth speed stage is established.

There is no need to bring the second clutch C2 into the connected state in order to establish the fifth speed stage. In the fourth speed stage and a sixth speed stage described later, however, it is necessary to bring the second clutch C2 into the connected state. Therefore, the second clutch C2 is placed in the connected state also in the fifth speed stage so as to smoothly perform a downshift from the fifth speed stage to the fourth speed stage and an upshift from the fifth speed stage to the sixth speed stage described later. Moreover, to enable the engine brake in the fifth speed stage, the second brake B2 including the two-way clutch may be switched to the normal-rotation preventing state.

To establish the sixth speed stage, the first brake B1 and the second brake B2, each of which is a two-way clutch, are brought into the reverse-rotation preventing state and the three (first to third) clutches C1 to C3 are brought into the connected state. The reverse-rotation preventing state of the first brake B1 causes the normal rotation of the third connected body Cc-Cd to be allowed. Moreover, the reverse-rotation preventing state of the second brake B2 causes the normal rotation of the sun gear Sc (seventh element) in the third planetary gear mechanism PGS3 to be allowed.

Furthermore, the connected state of the second clutch C2 and the third clutch C3 causes the respective elements of the first planetary gear mechanism PGS1 and the second planetary gear mechanism PGS2 to be in a state where relative rotation thereof is disabled, as described with respect to the fourth speed stage, and causes the rotation speed of the second connected body Ra-Sd to be "1." Moreover, the connected state of the first clutch C1 causes the rotation speed of the third connected body Cc-Cd to be "1."

Therefore, in the fourth planetary gear mechanism PGS4, the carrier Cd (11th element) and the sun gear Sd (12th element) have the same speed "1" and the respective elements are brought into a locked state where relative rotation thereof is disabled. Further, the rotation speed of the ring gear Rd (tenth element) in the fourth planetary gear mechanism PGS4, to which the output member 3 is connected, is set to "1" of "6th" illustrated in FIG. 3, and the sixth speed stage is established.

To establish a seventh speed stage, the first brake B1 and the second brake B2, each of which is a two-way clutch, are brought into the reverse-rotation preventing state, the third brake B3 is bought into the fixed state, and the first clutch C1 and the second clutch C2 are brought into the connected state. The reverse-rotation preventing state of the first brake B1 causes the normal rotation of the third connected body Cc-Cd to be allowed. Moreover, the reverse-rotation preventing state of the second brake B2 causes the normal rotation of the sun gear Sc (seventh element) in the third planetary gear mechanism PGS3 to be allowed.

Furthermore, the fixed state of the third brake B3 causes the rotation speed of the sun gear Sb (sixth element) in the second planetary gear mechanism PGS2 to be "0." Moreover, the connected state of the second clutch C2 causes the rotation speed of the ring gear Rb (fourth element) in the second planetary gear mechanism PGS2 to be "1," which is the same as the rotation speed of the sun gear Sa (first element) in the first planetary gear mechanism PGS1, and causes the rotation speed of the first connected body Ca-Cb-Rc including the carrier Cb (fifth element) in the second planetary gear mechanism PGS2 to be "i/(i+1)."

Furthermore, the connected state of the first clutch C1 causes the rotation speed of the third connected body Cc-Cd to be "1," which is the same as the rotation speed of the sun gear Sa (first element) in the first planetary gear mechanism PGS1 connected to the input shaft 2. Then, the rotation speed of the ring gear Rd (tenth element) in the fourth planetary gear mechanism PGS4, to which the output member 3 is connected, is set to "7th" illustrated in FIG. 3 and the seventh speed stage is established.

To establish an eighth speed stage, the first brake B1 and the second brake B2, each of which is a two-way clutch, are brought into the reverse-rotation preventing state, the third brake B3 is bought into the fixed state, and the first clutch C1 and the third clutch C3 are brought into the connected state. The reverse-rotation preventing state of the first brake B1 causes the normal rotation of the third connected body Cc-Cd to be allowed. Moreover, the reverse-rotation preventing state of the second brake B2 causes the normal rotation of the sun gear Sc (seventh element) in the third planetary gear mechanism PGS3 to be allowed.

Furthermore, the fixed state of the third brake B3 causes the rotation speed of the sun gear Sb (sixth element) in the second planetary gear mechanism PGS2 to be "0." Moreover, the connected state of the third clutch C3 causes the rotation speed of the second connected body Ra-Sd to be "0," which is the same as the rotation speed of the sun gear Sb (sixth element) in the second planetary gear mechanism PGS2. Furthermore, the connected state of the first clutch C1 causes the rotation speed of the third connected body Cc-Cd to be "1," which is the same as the rotation speed of the sun gear Sa (first element) in the first planetary gear mechanism PGS1. Then, the rotation speed of the ring gear Rd (tenth element) in the fourth planetary gear mechanism PGS4, to which the output member 3 is connected, is set to "8th" illustrated in FIG. 3 and the eighth speed stage is established.

To establish a ninth speed stage, the first brake B1 and the second brake B2, each of which is a two-way clutch, are brought into the reverse-rotation preventing state, the third brake B3 and the fourth brake B4 are bought into the fixed state, and the first clutch C1 is brought into the connected state. The reverse-rotation preventing state of the first brake B1 causes the normal rotation of the third connected body Cc-Cd to be allowed. Moreover, the reverse-rotation preventing state of the second brake B2 causes the normal rotation of the sun gear Sc (seventh element) in the third planetary gear mechanism PGS3 to be allowed.

Furthermore, the fixed state of the third brake B3 causes the rotation speed of the sun gear Sb (sixth element) in the second planetary gear mechanism PGS2 to be "0." Moreover, the fixed state of the fourth brake B4 causes the rotation speed of the ring gear Rb (fourth element) in the second planetary gear mechanism PGS2 to be "0." This causes the respective elements Sb, Cb, and Rb of the second planetary gear mechanism PGS2 to be in a locked state where relative rotation thereof is disabled, and the rotation speed of the first connected body Ca-Cb-Rc including the carrier Cb (fifth element) of the second planetary gear mechanism PGS2 to be also "0."

Moreover, the connected state of the first clutch C1 causes the rotation speed of the third connected body Cc-Cd to be "1," which is the same as the rotation speed of the sun gear Sa (first element) in the first planetary gear mechanism PGS1. Then, the rotation speed of the ring gear Rd (tenth element) in the fourth planetary gear mechanism PGS4, to which the output member 3 is connected, is set to "9th" illustrated in FIG. 3 and the ninth speed stage is established.

To establish a tenth speed stage, the first brake B1 and the second brake B2, each of which is a two-way clutch, are brought into the reverse-rotation preventing state, the fourth brake B4 is bought into the fixed state, and the first clutch C1 and the third clutch C3 are brought into the connected state. The reverse-rotation preventing state of the first brake B1 causes the normal rotation of the third connected body Cc-Cd to be allowed. Moreover, the reverse-rotation preventing state of the second brake B2 causes the normal rotation of the sun gear Sc (seventh element) in the third planetary gear mechanism PGS3 to be allowed.

Furthermore, the connected state of the third clutch C3 causes the second connected body Ra-Sd and the sun gear Sb (sixth element) in the second planetary gear mechanism PGS2 to rotate at the same speed. Furthermore, the fixed state of the fourth brake B4 causes the rotation speed of the ring gear Rb (fourth element) in the second planetary gear mechanism PGS2 to be "0." Moreover, the connected state of the first clutch C1 causes the rotation speed of the third connected body Cc-Cd to be "1," which is the same as the rotation speed of the sun gear Sa (first element) in the first planetary gear mechanism PGS1. Then, the rotation speed of the ring gear Rd (tenth element) in the fourth planetary gear mechanism PGS4, to which the output member 3 is connected, is set to "10th" illustrated in FIG. 3 and the tenth speed stage is established.

To establish a backward stage, the first brake B1, which is a two-way clutch, and the third brake B3 are brought into the fixed state, the second brake B2 is bought into the normal-rotation preventing state, and the second clutch C2 is brought into the connected state. The normal-rotation preventing state of the second brake B2 causes the reverse rotation of the sun gear Sc (seventh element) in the third planetary gear mechanism PGS3 to be allowed. Moreover, the fixed state of the third brake B3 and the connected state of the second clutch C2 cause the rotation speed of the first connected body Ca-Cb-Rc to be "i/(i+1)." Furthermore, the fixed state of the first brake B1 causes the rotation speed of the third connected body Cc-Cd to be "0." Then, the rotation speed of the ring gear Rd (tenth element) in the fourth planetary gear mechanism PGS4, to which the output member 3 is connected, is set to "Rvs" which means a reverse rotation illustrated in FIG. 3 and the backward stage is established.

Speed lines indicated by dashed lines in FIG. 3 represent that some of the four planetary gear mechanisms PGS1 to PGS4 transmit motive power and the respective elements of other planetary gear mechanisms rotate (spin free) following the planetary gear mechanisms that transmit the motive power.

FIG. 4 is a diagram illustrating the states of the clutches C1 to C3 and the brakes B1 to B4 in the respective variable speed stages collectively. Each circle mark in each column of the three (first to third) clutches C1 to C3 and the third brake B3 and the fourth brake B4 indicates a connected state or a fixed state, and a blank cell indicates a release state. Furthermore, "R" in the first brake B1 column indicates a reverse-rotation preventing state and "F" in the column indicates a fixed state. Moreover, "R" in the second brake B2 column indicates a reverse-rotation preventing state and "F" in the column indicates a normal-rotation preventing state.

Moreover, underlined "R" and "F" indicate that the rotation speed of the third connected body Cc-Cd or the sun gear Sc (seventh element) in the third planetary gear mechanism PGS3 is set to "0" by the action of the first brake B1 or the second brake B2. Furthermore, "R/F" indicates that normally "R" which means a reverse-rotation preventing state is used, but in the case of enabling the engine brake, the state is switched to "F" which means a fixed state or a normal-rotation preventing state.

Moreover, FIG. 4 illustrates a transmission gear ratio (the rotation speed of the input shaft 2/the rotation speed of the output member 3) at each variable speed stage when the gear ratio h of the first planetary gear mechanism PGS1 is 2.734, the gear ratio i of the second planetary gear mechanism PGS2 is 1.614, the gear ratio j of the third planetary gear mechanism PGS3 is 2.681, and the gear ratio k of the fourth planetary gear mechanism PGS4 is 1.914 and each common ratio (the transmission gear ratio between neighboring variable speed stages: a value obtained by dividing the transmission gear ratio in a predetermined variable speed stage by a transmission gear ratio in a variable speed stage one stage higher than the predetermined variable speed stage). According thereto, it is understood that the common ratios can be set appropriately.

The following describes the two-way clutch in detail with reference to FIG. 5. The first brake B1 is a two-way clutch switchable between a fixed state where the third connected body Cc-Cd is fixed to the transmission case 1 and a reverse-rotation preventing state where the normal rotation of the third connected body Cc-Cd is allowed and a reverse rotation thereof is prevented. The two-way clutch will be described concretely by giving an example of the two-way clutch illustrated in FIG. 5.

The two-way clutch TW as the first brake B1 in FIG. 5 includes an inner ring TW1 connected to the third connected body Cc-Cd, an outer ring TW2 which is arranged in a radial outer portion of the inner ring TW1 so as to be spaced away from the inner ring TW1, and a holding ring TW3 arranged between the inner ring TW1 and the outer ring TW2.

The inner ring TW1 includes a plurality of cam surfaces TW1a on its outer peripheral surfaces. The holding ring TW3 includes a plurality of notched holes TW3a corresponding to the cam surfaces TW1a. Each of the notched holes TW3a houses a roller TW4. Moreover, the two-way clutch TW includes a meshing mechanism, which is not illustrated.

The meshing mechanism is switchable between an outer connection state where the outer ring TW2 and the holding ring TW3 are connected to each other and an inner connection state where the inner ring TW1 and the holding ring TW3 are connected to each other.

Figure 5A:
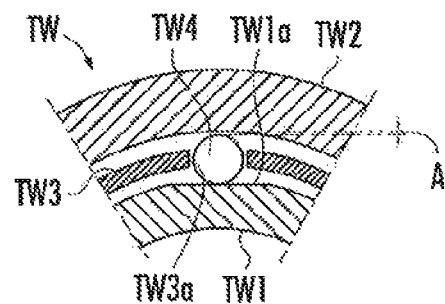
FIG. 5A-C is an explanatory diagram illustrating a two-way clutch of the present embodiment.
Figure 5B:
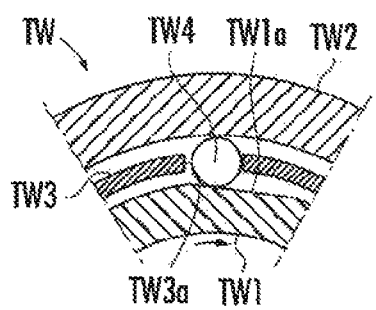
Figure 5C:
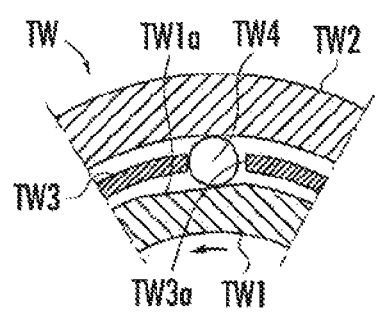

The diameter of the roller TW4 is set such that a space A is present when the roller TW4 is on a central portion of the cam surface TW1a, as illustrated in FIG. 5A, and such that the roller TW4 is in contact with the inner ring TW1 and outer ring TW2 when the roller TW4 is on an end portion of the cam surface TW1a, as illustrated in FIGS. 5B and 5C.

In the outer connection state where the outer ring TW2 and the holding ring TW3 are connected to each other in the meshing mechanism, even if the inner ring TW1 attempts to make either rotation of the normal rotation and the reverse rotation, the roller TW4 is in the end portion of the cam surface TW1a because the holding ring TW3 is also fixed to the transmission case 1 as illustrated in FIGS. 5B and 5C.

At this time, the roller TW4 is sandwiched between the cam surface TW1a and the inner peripheral surface of the outer ring TW2, and the rotation of the inner ring TW1 is prevented. That is, the two-way clutch TW is placed in the fixed state.

In the meshing mechanism, which is not illustrated, a notched hole TW3a is located in one end portion of the cam surface TW1a as illustrated in FIG. 5B in the inner connection state where the inner ring TW1 and the holding ring TW3 are connected to each other.

When the clockwise direction in FIG. 5 is a reverse rotation direction, the two-way clutch TW is brought into the reverse-rotation preventing state by making the inner connection state where the inner ring TW1 and the holding ring TW3 are connected to each other.

Furthermore, a vehicle with the automatic transmission TM according to this embodiment includes a shift lever 42 whose shift position is switchable to any one of the forward range, the neutral range, and the backward range, an oil-temperature detection unit 43a which detects the temperature of the oil (oil temperature) of a hydraulic control circuit 43, an oil-pressure detection unit 43b which detects the line pressure of the hydraulic control circuit 43, an oil-pressure regulating unit 43c including an oil-pressure regulating valve freely regulating the line pressure of the hydraulic control circuit 43, a vehicle speed detection unit 44 which detects the running speed of the vehicle, an engine brake determination unit 46 which detects the on-off state of the engine brake, a drive source rpm detection unit 48 which detects the rpm of a drive source ENG, an input rpm detection unit 50 which detects the rpm of the input shaft 2, a brake pedal detection unit 54 which detects the on-off state of a brake pedal, and an accelerator opening degree detection unit 56 which detects the on-off state of an accelerator pedal.

The control unit ECU receives information on the shift position of the shift lever 42, information on the temperature of oil (oil temperature) of the hydraulic control circuit 43 sent from the oil-temperature detection unit 43a, information on the line pressure (oil pressure) sent from the oil-pressure detection unit 43b, information on the running speed of the vehicle sent from the vehicle speed detection unit 44, information on the on-off state of the engine brake as the usage state of the engine brake sent from the engine brake determination unit 46, information on the rpm of the drive source ENG sent from the drive source rpm detection unit 48, information on the rpm of the input shaft 2 sent from the input rpm detection unit 50, information on the on-off state of the brake pedal sent from the brake pedal detection unit 54, and information on the on-off state of the accelerator pedal sent from the accelerator opening degree detection unit 56.

Figure 7:
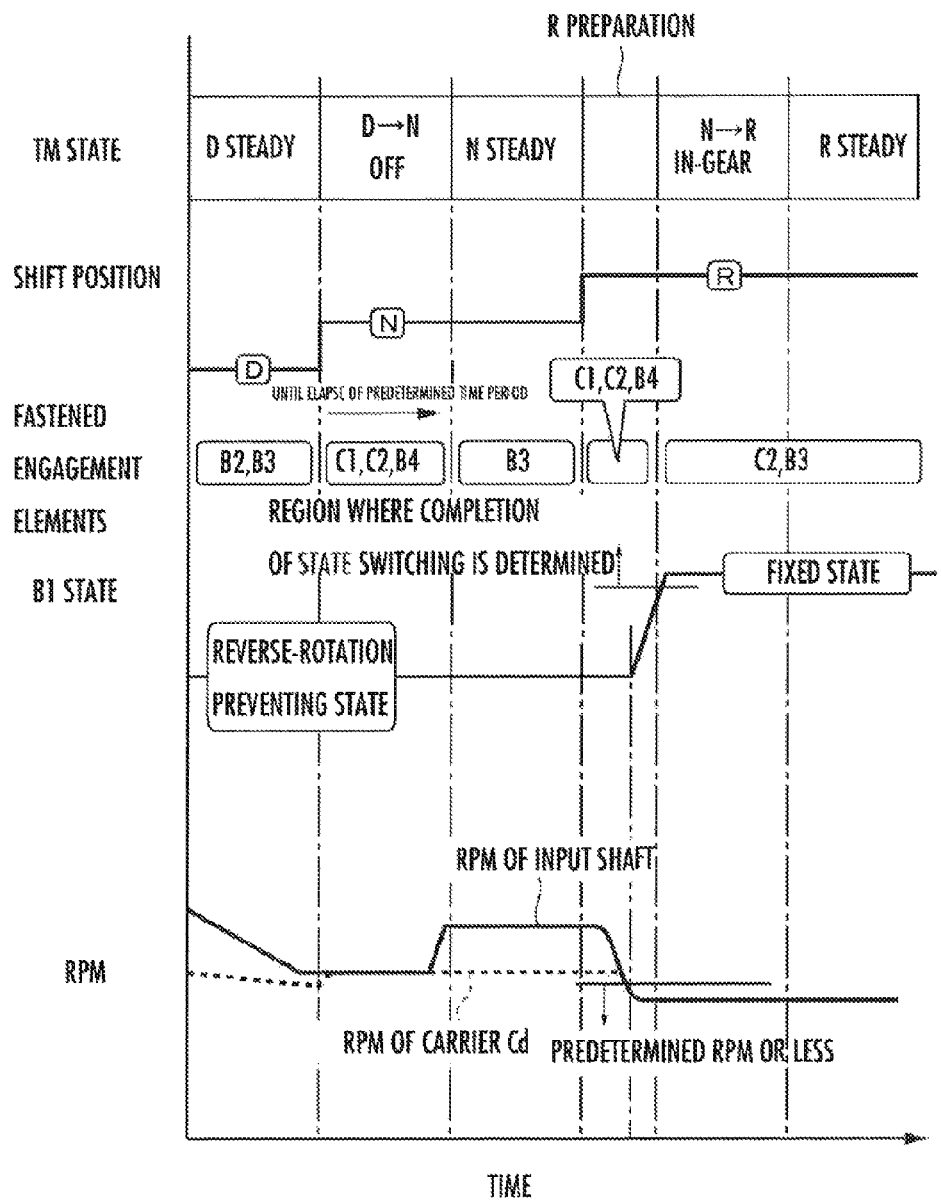
FIG. 7 is an explanatory diagram illustrating the working of a switching mechanism when performing the backward preparation mode of the present embodiment.

The following describes a backward preparation mode of the automatic transmission TM according to the embodiment with reference to FIGS. 6 and 7. In the backward preparation mode, when the operation of the shift lever 42 causes the shift position to be switched from a forward range (D range) to a backward range (R range) through a neutral range (N range), the main processing is performed after the shift to the backward range (R range). In addition, the backward preparation mode is performed in a predetermined cycle time.

The automatic transmission TM according to the embodiment is controlled to perform neutral preparation processing (the state of the automatic transmission TM indicated by "D→N OFF" in FIG. 7) for lowering the rpm of the input shaft 2, with the first clutch C1, the second clutch C2, and the fourth brake B4 in a fastened state, until an elapse of a predetermined time period set to the time when the rpm of the input shaft 2 is estimated to be lowered to a predetermined rpm when the shift position is switched from the forward range to the neutral range by the operation of the shift lever 42.

First, as illustrated in FIG. 6, it is checked whether the shift position has been switched from the neutral range (N range) to the backward range (R range) in step 1. If the shift position has not been switched yet to the backward range, the current processing is terminated directly. If the shift position has been switched to the backward range, the processing proceeds to step 2, in which it is checked whether the first brake B1 is in the reverse-rotation preventing state. If the first brake B1 is in the reverse-rotation preventing state, the processing proceeds to step 3, in which oil pressure is supplied (output) to the first clutch C1, the second clutch C2, and the fourth brake B4 and then the processing in the backward preparation mode (R preparation) is started.

Thereafter, the processing proceeds to step 4 to determine whether the fastening (engagement) of the first clutch C1 is completed. Unless the fastening of the first clutch C1 is completed, the current processing is terminated directly. If the fastening of the first clutch C1 is completed, the processing proceeds to step 5 to determine whether the rpm Nin of the input shaft 2 is equal to or less than a predetermined rpm as a threshold value.

In step 5, the fastening of the first clutch C1 is completed and therefore the rpm Nin of the input shaft 2 can be estimated to be the same as the rpm of the carrier Cd (11th element). Specifically, in step 5, it is determined whether the rpm of the carrier Cd (11th element) is equal to or less than the predetermined rpm. In this embodiment, the determination based on the rpm of the input shaft 2 has the same meaning as the determination based on the rpm of the carrier Cd (11th element).

Moreover, the vehicle, on which the automatic transmission TM according to this embodiment is mounted, is provided with an oil-temperature detection unit 43a which detects the temperature (oil temperature) of oil supplied to the hydraulic control circuit and a vehicle speed detection unit 44 which finds a vehicle speed. The control unit ECU receives information on the oil temperature detected by the oil-temperature detection unit 43a and receives information on the vehicle speed detected by the vehicle speed detection unit 44.

Alternatively, in step 5, the predetermined time period may be set from map data or the like previously stored in the control unit ECU on the basis of the oil temperature detected by the oil-temperature detection unit 43a and the vehicle speed detected by the vehicle speed detection unit 44, and it is also possible to determine whether the rpm of the carrier Cd (11th element) is equal to or less than the predetermined rpm according to whether the predetermined time period has elapsed. According thereto, even in the case where the fastening of the first clutch C1 has not been completed yet, the rpm of the carrier Cd (11th element) as an element fixed by the switching mechanism can be detected (estimated). If the rpm Nin of the input shaft 2 exceeds the predetermined rpm in step 5, the current processing is terminated directly.

If the rpm of Nin of the input shaft 2 is equal to or less than the predetermined rpm, the processing proceeds to step 6 to request the limitation of an output torque from a drive source ENG for running in order to prevent a rapid rise of the torque. Thereafter, the processing proceeds to step 7, in which the first brake B1 is switched from the reverse-rotation preventing state to the fixed state and the current processing is terminated.

If the first brake B1 is switched from the reverse-rotation preventing state to the fixed state in step 7, the first brake B1 is in the fixed state in step 2 when the processing of the flowchart in FIG. 6 is performed next time, and therefore the processing branches to step 8. Then, in step 8, the execution of normal processing of the backward range (backward normal mode) is started and the current processing is terminated. As illustrated in FIG. 7, in the backward normal mode after the termination of the processing of the backward preparation mode (R preparation), backward in-gear processing (NR in-gear) is performed and then backward steady (R steady) processing is performed.

Subsequently, forward preparation mode of the automatic transmission TM according to this embodiment will be described with reference to FIGS. 8 and 9. The forward preparation mode is used to previously perform switching from the reverse-rotation preventing state to the fixed state of the first brake B1 in the forward range (D range).

In the forward preparation mode, the processing of the forward preparation mode is started, first, and then in step 11, it is checked whether the shift position is in the forward range (D range). If the shift position is in the forward range, the processing proceeds to step 12 to check whether the first brake B1 is in the reverse-rotation preventing state. If the first brake B1 is in the reverse-rotation preventing state, the processing proceeds to step 13 to check whether the variable speed stage of the automatic transmission TM is the first forward speed stage. Unless the variable speed stage is the first forward speed stage, the current processing is terminated directly. If the forward range is selected and the variable speed stage of the automatic transmission TM is the second speed stage or higher, the automatic transmission TM is in a state where the carrier Cd is rotating at relatively high speed. Therefore, the state of the first brake B1 cannot be switched.

If the variable speed stage of the automatic transmission TM is the first forward speed stage in step 13, the processing proceeds to step 14 to check whether the running speed of the vehicle is a predetermined first speed or lower. Alternatively, the predetermined first speed may be set to the same speed as the running speed of the vehicle used for switching from the variable speed stage of the second forward speed stage or higher to the first forward speed. In this case, step 13 may be omitted.

If the running speed of the vehicle is the predetermined first speed or lower in step 14, the processing proceeds to step 15 to check whether the vehicle is in a state where the accelerator is not pressed, in other words, the vehicle is in an accelerator-off state. If the vehicle is in the accelerator-off state, the processing proceeds to step 16 to check whether the running speed of the vehicle is lower than a predetermined third speed which is set to a higher speed than the predetermined first speed.

If the running speed of the vehicle is lower than the predetermined third speed in step 16, the processing proceeds to step 17 to supply (output) oil pressure to the second brake B2, the third brake B3, and the fourth brake B4 in order to fasten the second brake B2, the third brake B3, and the fourth brake B4.

Thereafter, the processing proceeds to step 18 to check whether the fastening of the fourth brake B4 is completed. Unless the fastening of the fourth brake B4 is completed, the current processing is terminated directly.

If the fastening of the fourth brake B4 is completed in step 18, the processing proceeds to step 19 to check whether the rpm Nin of the input shaft 2 is the predetermined rpm or less. Unless the rpm Nin of the input shaft 2 is the predetermined rpm or less, the current processing is terminated directly.

If the rpm Nin of the input shaft 2 is the predetermined rpm or less in step 19, the processing proceeds to step 20 to request the limitation of a torque output to the drive source ENG to prevent an occurrence of a large torque fluctuation which may occur when a driver steps on the accelerator pedal for switching the first brake B1 from the reverse-rotation preventing state to the fixed state. Thereafter, the processing proceeds to step 21 to switch the first brake B1 from the reverse-rotation preventing state to the fixed state and to terminate the processing.

Unless the shift position is in the forward range in step 11, in other words, if the shift position is in the neutral range or backward range in step 11, the processing branches to step 22 to terminate the forward preparation mode and then to terminate the processing. Unless the first brake B1 is in the reverse-rotation preventing state in step 12, in other words, if the first brake B1 is in the fixed state in step 12, the processing branches to step 22 to terminate the forward preparation mode and then to terminate the processing. Unless the vehicle is in the accelerator-off state in step 15, in other words, if the vehicle is in a state where the accelerator is pressed (accelerator-on state) in step 15, the processing branches to step 22 to terminate the forward preparation mode and then to terminate the processing. Unless the running speed of the vehicle is less than the predetermined third speed in step 16, in other words, if the running speed of the vehicle is the predetermined third speed or higher in step 16, the processing branches to step 22 to terminate the forward preparation mode and then to terminate the processing.

Unless the running speed of the vehicle is the predetermined first speed or lower in step 14, in other words, if the running speed of the vehicle exceeds the predetermined first speed in step 14, the processing branches to step 23 to check whether the running speed of the vehicle is equal to or lower than the predetermined second speed which is set to a speed higher than the predetermined first speed and the predetermined third speed. Unless the running speed of the vehicle is equal to or lower than the predetermined second speed, in other words, if the running speed of the vehicle exceeds the predetermined second speed, the current processing is terminated directly. The predetermined second speed only needs to be set higher than the predetermined first speed. For example, the predetermined second speed can be set to a speed equal to or lower than the predetermined third speed.

If the running speed of the vehicle is the predetermined second speed or lower in step 23, the processing proceeds to step 24 to supply low oil pressure to the fourth brake B4 so that the fourth brake B4 can be rapidly fastened and then to terminate the current processing.

In the forward preparation mode, "No" is determined in step 11 and the forward preparation mode is terminated in step 22 in the case where the shift position shifts from the forward range to the neutral range by the operation of the shift lever 42 before the first brake B1 is switched from the reverse-rotation preventing state to the fixed state. In this case, the backward preparation mode described with reference to FIGS. 6 and 7 is performed to switch the first brake B1 from the reverse-rotation preventing state to the fixed state.

According to the automatic transmission TM of this embodiment, the shift transmission with ten forward speed stages is able to be performed. Moreover, in each variable speed stage, the number of engagement mechanisms in the release state (the number of released mechanisms) is four or less among the wet multi-plate clutches and the wet multi-plate brakes. This prevents an increase in a friction loss relative to the conventional automatic transmission capable of shift transmission with eight forward speed stages, though the automatic transmission according to the present invention is able to perform shift transmission with ten forward speed stages.

Moreover, according to the automatic transmission TM of this embodiment, the backward preparation mode illustrated by the flowchart in FIG. 6 and illustrated as "R preparation" in FIG. 7 causes the rpm of the carrier Cd (11th element) of the fourth planetary gear mechanism PGS4 fixed by the first brake B1, which is the switching mechanism, to be is equal to or less than the predetermined rpm set to the rpm at which the first brake B1 is switchable in a state where the generation of the switching sound is suppressed by bringing the first clutch C1 and the second clutch C2, which are engagement mechanisms, to be in the connected state and the fourth brake B4, which is also an engagement mechanism, to be in the fixed state. This enables the first brake B1 to be rapidly switched to the fixed state and enables the generation of the switching sound of the first brake B1 to be suppressed.

Here, whether the rpm of the carrier Cd (11th element) is equal to or less than the predetermined rpm in the backward preparation mode can be determined by providing an rpm detection unit such as, for example, an rpm sensor. This, however, requires the provision of the rpm detection unit for detecting the rpm of the carrier Cd (11th element) in the automatic transmission TM, which increases the number of parts and cost.

Therefore, the automatic transmission TM of this embodiment is provided with the oil-temperature detection unit 43a which detects an oil temperature and the vehicle speed detection unit 44 which detects the running speed of the vehicle, and the control unit ECU sets a predetermined time period according to the oil temperature detected by the oil-temperature detection unit 43a and the vehicle speed detected by the vehicle speed detection unit 44 and determines whether the rpm of the carrier Cd (11th element) is equal to or less than the predetermined rpm according to whether the predetermined time period has elapsed.

According to this configuration, there is no need to provide the rpm detection unit which detects the rpm of the carrier Cd (11th element) fixed by the first brake B1, which is a switching mechanism, separately, thereby preventing an increase in the number of parts and preventing an increase in cost.

Moreover, according to the backward preparation mode of this embodiment, the carrier Cd (11th element) fixed by the first brake B1 fastens other engagement elements, thereby enabling a rapid shift to a backward in-gear state (the "NR in-gear" state in FIG. 7) in comparison with the case of waiting until the rpm naturally decreases to a level equal to or less than the predetermined rpm, without forcibly decreasing the rpm. In the backward preparation mode, however, a shift to the backward in-gear state cannot be performed until the completion of the backward preparation mode after the backward range is selected.

According to the forward preparation mode of this embodiment, the first brake B1, which is a switching mechanism, is switched from the reverse-rotation preventing state to the fixed state during the forward range. Therefore, when the shift position is switched from the forward range to the backward range, the automatic transmission TM is able to shift to the backward in-gear state (the "NR in-gear" state in FIG. 7) immediately, thereby further improving the running response in the backward range.

Moreover, in this embodiment, the fourth brake B4, which is an engagement mechanism, is of the oil pressure operation type. The control unit ECU supplies standby oil pressure to the fourth brake B4 which is placed in the fixed state in the forward preparation mode which is performed in the case where the vehicle speed detected by the vehicle speed detection unit 44 is the predetermined first vehicle speed or lower and the second forward speed stage, which is the lowest speed stage among the plurality of variable speed stages, is established if the shift position is in the forward range (step 24 in FIG. 8).

According to this configuration, the standby oil pressure is supplied to the fourth brake B4, which is an engagement mechanism, thereby enabling a rapid completion of the forward preparation mode.

The forward preparation mode is performed in the forward range, and therefore there might be a case where the vehicle starts up again with the shift position placed in the forward range without a shift to the backward range. Therefore, the control unit ECU terminates the forward preparation mode when the vehicle speed detection unit 44 detects the running speed of the vehicle equal to or higher than the predetermined third vehicle speed ("No" in step 16 in FIG. 8) or the accelerator opening degree detected by the accelerator opening degree detection unit 56 is equal to or more than the predetermined opening degree (which means the accelerator-on state in this embodiment: "No" in step 15 in FIG. 8). This enables the vehicle to start up smoothly.

In the embodiment, an example of the second brake B2 which is a two-way clutch has been described. Alternatively, with the second brake B2 which is a wet multi-plate brake or a meshing mechanism, the advantageous effects of the present invention can be achieved such that the number of released wet multi-plate clutches and wet multi-plate brakes at each variable speed stage is suppressed at four or less and a friction loss is reduced.

If the second brake B2 is a wet multi-plate brake or a meshing mechanism, the second brake B2 is placed in the fixed state in the first to fifth speed stages and in the release state in other variable speed stages.

Moreover, in the automatic transmission TM of this embodiment, any one of the variable speed stages (for example, the tenth speed stage) may be omitted to perform a shift transmission with nine forward speed stages.

Furthermore, in this embodiment, the shift position is switched by a shift lever operation. The shift position switching method, however, is not limited thereto. For example, the shift position may be switched by pressing a button. In this case, for example, the shift position selected from the pressing signal of the button may be determined.

Moreover, this embodiment has been described by using the first brake which is a two-way clutch switchable by a meshing mechanism as a switching mechanism according to the present invention. The switching mechanism of the present invention, however, is not limited thereto. For example, an electromagnetic clutch may be used, instead of the meshing mechanism, for switching between the fixed state and the reverse-rotation preventing state of the two-way clutch.

Moreover, the switching mechanism of the present invention may be a two-way clutch as described in Japanese Patent No. 4887949. The two-way clutch will be described as another embodiment of the automatic transmission of the present invention illustrated in FIGS. 10 to 14.

Figure 10:
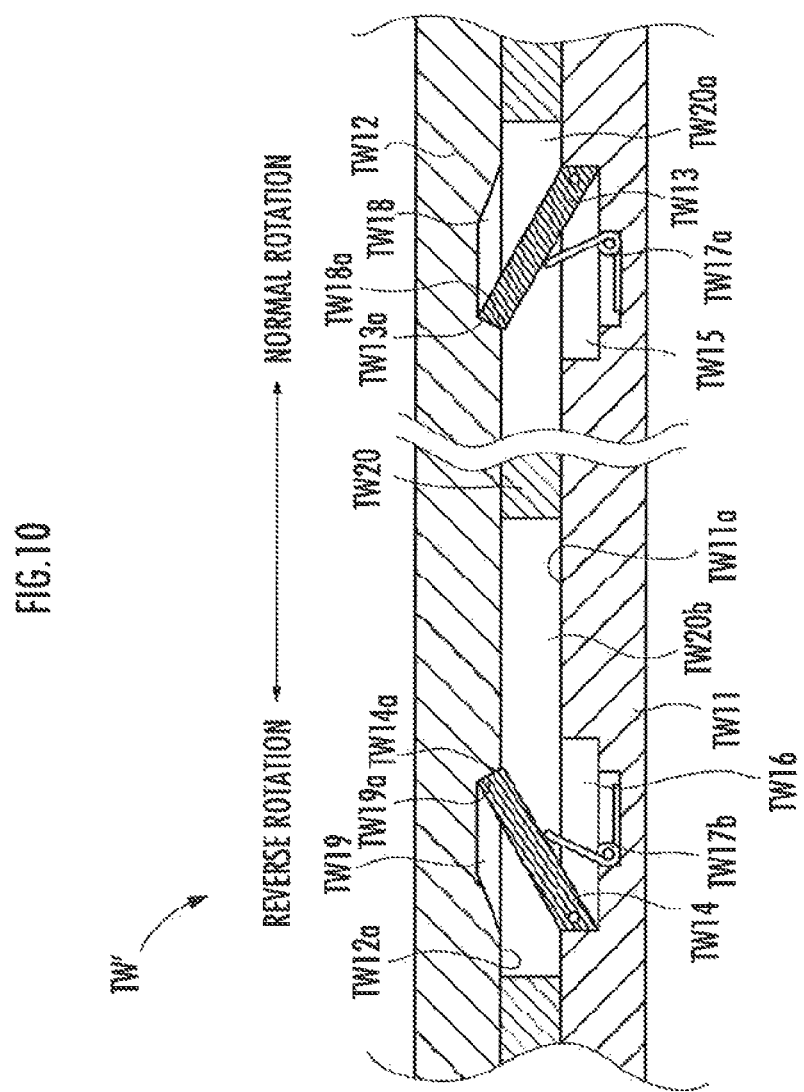
FIG. 10 is a sectional view illustrating a fixed state of a two-way clutch of another embodiment.
Figure 11:
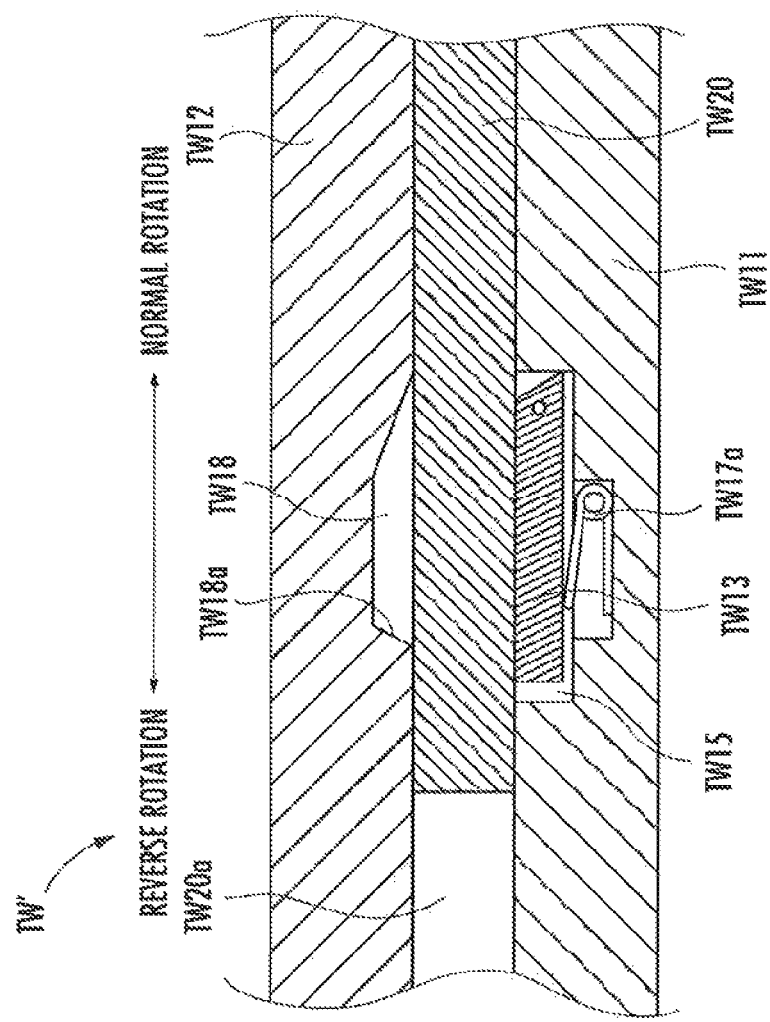
FIG. 11 is a sectional view illustrating a reverse-rotation preventing state of the two-way clutch of another embodiment.
Figure 12:
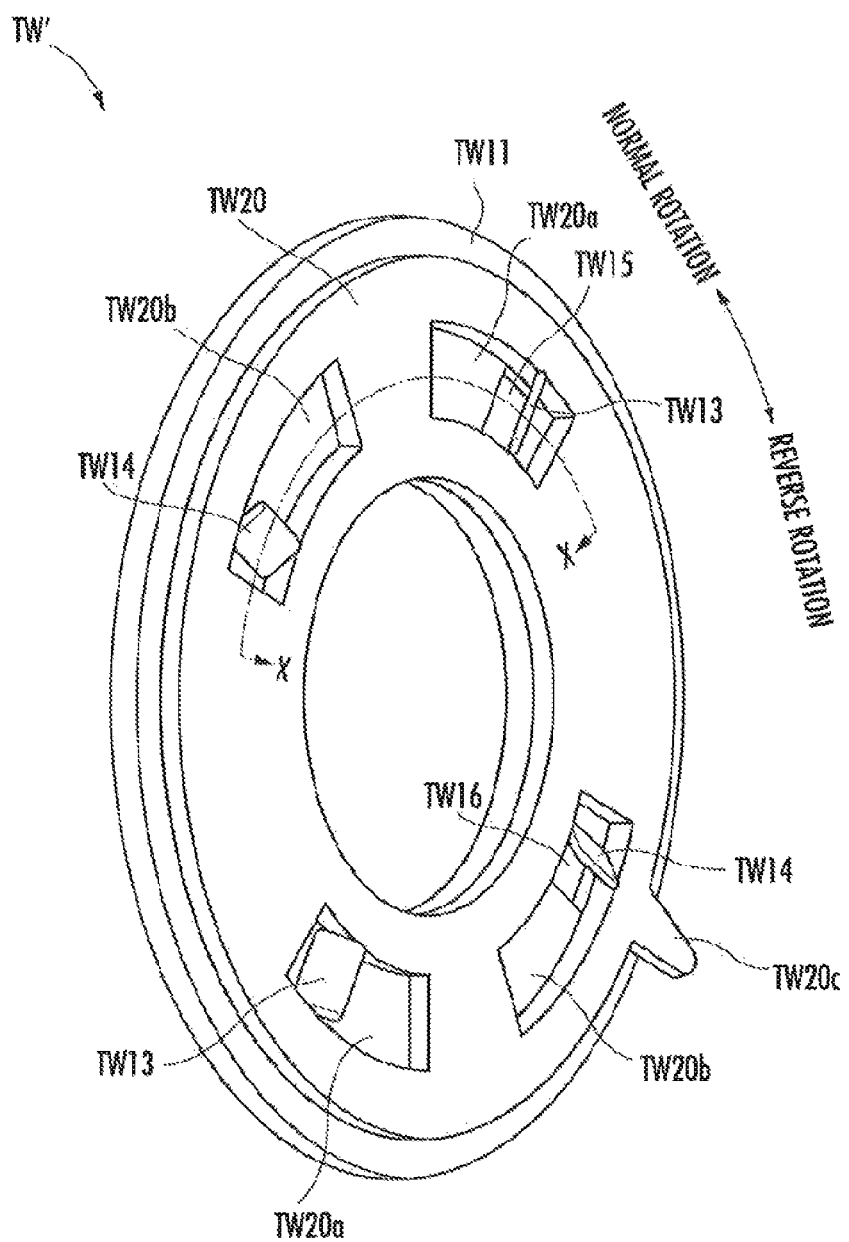
FIG. 12 is a perspective view illustrating the fixed state of the two-way clutch of another embodiment.

As illustrated by cross sections in FIGS. 10 and 11, a two-way clutch TW' of another embodiment includes a fixed plate TW11 fixed to the transmission case 1 and a rotating plate TW12. As illustrated in FIG. 12, the fixed plate TW11 is formed in a ring shape (torus shape). Although omitted in FIG. 12, the rotating plate TW12 is also formed in a ring shape (torus shape) similarly to the fixed plate TW11, and the fixed plate TW11 and the rotating plate TW12 are arranged coaxially with each other.

As illustrated in FIG. 10, in an opposed surface TW11a, which faces a rotating plate TW12, in a fixed plate TW11, there are provided a plate-like normal-rotation preventing side swing portion TW13 whose end TW13a, which is located on the other side in the circumferential direction (the direction in which the rotating plate TW12 reversely rotates) of the fixed plate TW11, swings around an end portion on one side in the circumferential direction (the direction in which the rotating plate TW12 normally rotates) of the fixed plate TW11 and a plate-like reverse-rotation preventing side swing portion TW14 whose end TW14a, which is located on one side in the circumferential direction (the normal rotation direction) of the fixed plate TW11, swings around an end portion on the other side in the circumferential direction (the reverse rotation direction) of the fixed plate TW11.

Moreover, in the opposed surface TW11a of the fixed plate TW11, there are provided recesses TW15 and TW16 which are concave so as to house the normal-rotation preventing side swing portion TW13 and the reverse-rotation preventing side swing portion TW14, respectively. On the bottom surfaces of the recesses TW15 and TW16, there are provided biasing members TW17a and TW17b which are made of springs for biasing the swing portions TW13 and TW14 in such a way that the swing ends TW13a and TW14a of the corresponding swing portions TW13 and TW14 protrude from the recesses TW15 and TW16.

On an opposed surface TW12a which faces the fixed plate TW11 in the rotating plate TW12, there are provided holes TW18 and TW19 in the positions corresponding to the swing portions TW13 and TW14, respectively. In the first hole TW18 which is provided in the position corresponding to the normal-rotation preventing side swing portion TW13, there is provided a first engaging portion TW18a, which is step-like so as to be engageable with the swing end TW13a of the normal-rotation preventing side swing portion TW13, where the first engaging portion TW18a is located on the other side in the circumferential direction (the reverse rotation direction) of the rotating plate TW12.

In the second hole TW19 which is provided in the position corresponding to the reverse-rotation preventing side swing portion TW14, there is provided a second engaging portion TW19a, which is step-like so as to be engageable with the swing end TW14a of the reverse-rotation preventing side swing portion TW14, where the second engaging portion TW19a is located on one side in the circumferential direction (the normal rotation direction) of the rotating plate TW12.

As illustrated in FIGS. 10 and 12, if the end TW13a of the normal-rotation preventing side swing portion TW13 is engageable with the first engaging portion TW18a and the end TW14a of the reverse-rotation preventing side swing portion TW14 is engageable with the second engaging portion TW19a, both of the normal and reverse rotations of the rotating plate TW12 are prevented. Therefore, the state where the ends TW13a and TW14a engage with the engaging portions TW18a and TW19a corresponding to the ends TW13a and TW14a, respectively, is the fixed state of the two-way clutch TW' according to another embodiment.

A switch plate TW20 is interposed between the fixed plate TW11 and the rotating plate TW12. As illustrated in FIG. 12, the switch plate TW20 is also formed in a ring shape (torus shape). The switch plate TW20 is provided with notched holes TW20a and TW20b in the positions corresponding to the swing portions TW13 and TW14, respectively.

Figure 13:
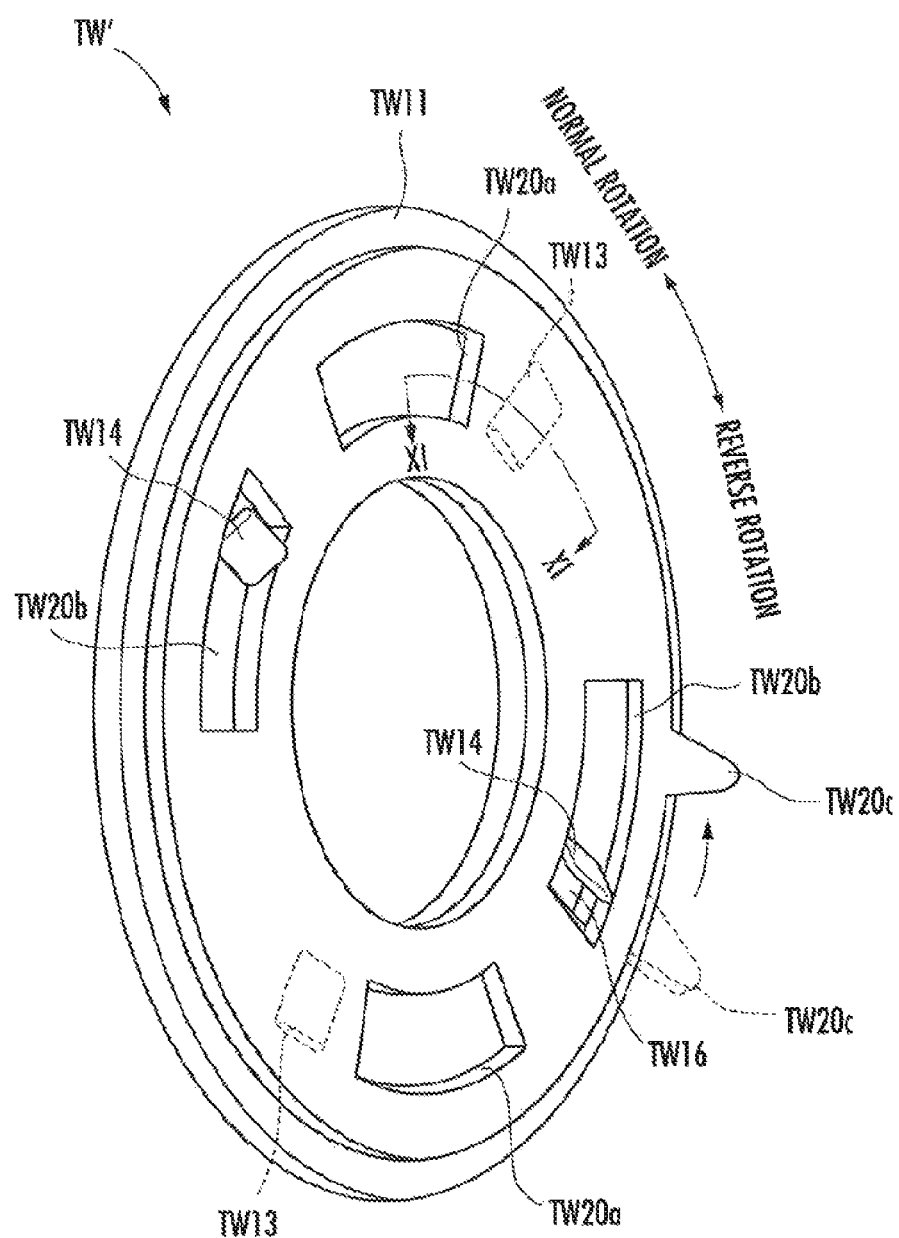
FIG. 13 is a perspective view illustrating the reverse-rotation preventing state of the two-way clutch of another embodiment.

On the outer edge of the switch plate TW20, there is provided a protrusion TW20c which protrudes outward in a radial direction. As illustrated in FIG. 13, the switch plate TW20 is swingable relative to the fixed plate TW11.

When the switch plate TW20 swings in the state illustrated in FIG. 13 from the fixed state illustrated in FIG. 12, as illustrated in FIG. 11, the first notched hole TW20a corresponding to the normal-rotation preventing side swing portion TW13 slides over the normal-rotation preventing side swing portion TW13 and the normal-rotation preventing side swing portion TW13 is pushed by the switch plate TW20 so as to be against the biasing force of the biasing member TW17a and housed in the recess TW15. This prevents the engagement between the end TW13a of the normal-rotation preventing side swing portion TW13 and the first engaging portion TW18a. Accordingly, the rotation of the rotating plate TW12 in the normal rotation direction is allowed.

Moreover, as illustrated in FIG. 13, the second notched hole TW20b corresponding to the reverse-rotation preventing side swing portion TW14 is configured so that the end TW14a is able to engage with the second engaging portion TW19a without the housing of the reverse-rotation preventing side swing portion TW14 into the recess TW16, also when the switch plate TW20 swings from the fixed state illustrated in FIG. 12 to the state illustrated in FIG. 13.

According thereto, the state illustrated in FIGS. 11 and 13 is a reverse-rotation preventing state of the two-way clutch TW' according to another embodiment.

As illustrated in FIG. 14, the switch plate TW20 is able to be switched by using a hydraulic control circuit. The hydraulic control circuit illustrated in FIG. 14 includes a slider 100 engaging with the protrusion TW20c provided in the switch plate TW20. If the slider 100 is located on the right-hand side of FIG. 14, the two-way clutch TW' is switched to the reverse-rotation preventing state. If the slider 100 is located on the left-hand side of FIG. 14, the two-way clutch TW' is switched to the fixed state.

On the right-hand side of the slider 100 in the drawing, line pressure is freely supplied to the slider 100 through a first open-close valve 101 which is a solenoid valve. On the left-hand side of the slider 100 in the drawing, line pressure is freely supplied to the slider 100 through a second open-close valve 102 which is a solenoid valve. The first open-close valve 101 is of a normal close type and the second open-close valve 102 is of a normal open type.

Moreover, on the right-hand side of the slider 100 in the drawing, there is provided oil pressure, which is to be supplied to the second clutch C2, on a surface different from the surface which receives the line pressure. On the left-hand side of the slider 100 in the drawing, there is provided oil pressure which is to be supplied to the first clutch C1, on a surface different from the surface which receives the line pressure. The oil pressure of the first clutch C1 and the second clutch C2 to be supplied to the slider 100 is used as RVS preparation pressure.

In addition, the slider 100 is provided with a detent mechanism 103 so as to prevent switching between the fixed state and the reverse-rotation preventing state unless the line pressure exceeds predetermined pressure. According to the hydraulic control circuit, the line pressure is set to be equal or higher than predetermined switching oil pressure which is set on the basis of a difference in oil pressure between the first clutch C1 and the second clutch C2 and the engaging force of the detent mechanism 103 with the first open-close valve 101 opened and the second open-close valve 102 closed, by which the slider 100 moves to the left-hand side of the drawing and the two-way clutch TW' is switched to the fixed state. To the contrary, the line pressure is set to be equal or higher than the aforementioned predetermined switching oil pressure with the first open-close valve 101 closed and the second open-close valve 102 opened, by which the slider 100 moves to the right-hand side in the drawing and the two-way clutch TW' is switched to the reverse-rotation preventing state.

Figure 8:
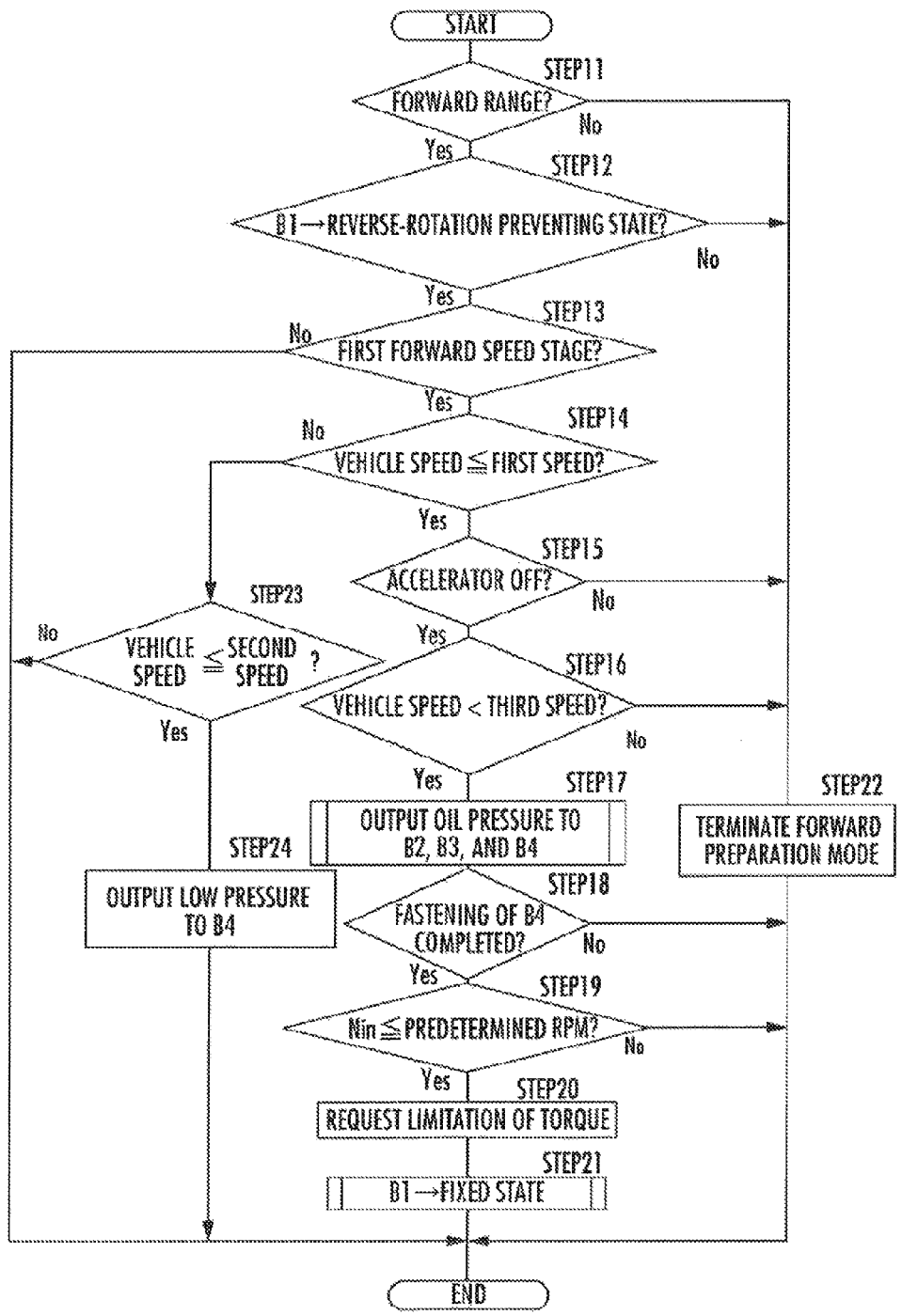
FIG. 8 is a flowchart illustrating processing in a forward preparation mode of the present embodiment.
Figure 9:
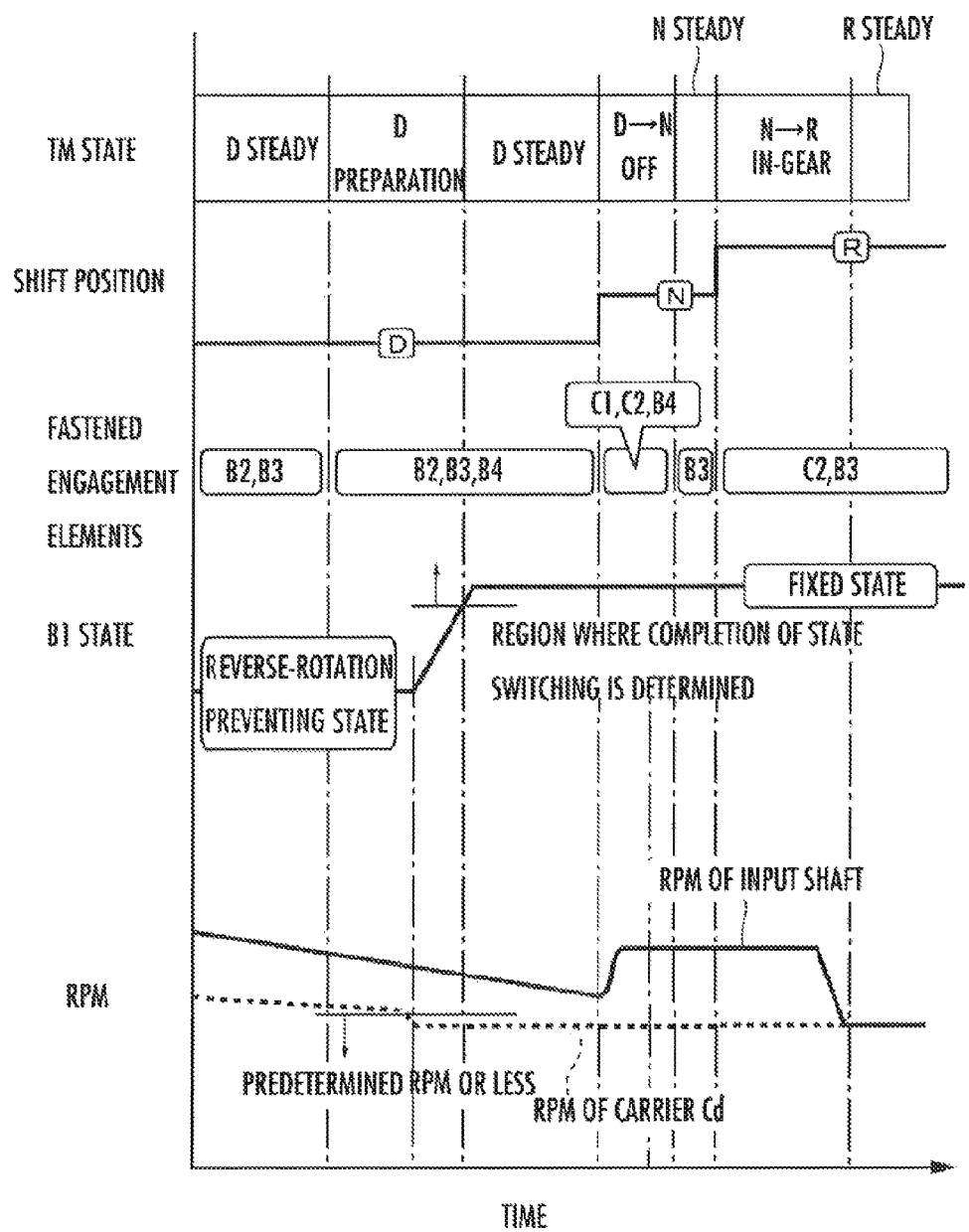
FIG. 9 is an explanatory diagram illustrating the working of the switching mechanism when performing the forward preparation mode of the present embodiment.

In the case of using the hydraulic control circuit, the flowcharts of FIGS. 15 and 16 are used, instead of the flowcharts of FIGS. 6 and 8. The flowchart of FIG. 15 is the same as the flowchart of FIG. 6, except that step 3' is included between steps 3 and 4 and that steps 5' and 9 are included between steps 5 and 6, compared to the flowchart of FIG. 6. Therefore, the same processes as those of FIG. 6 are performed in FIG. 15 in the steps having the same reference numerals as those of FIG. 6 and thus the description of the same processes will be omitted.

After oil pressure is supplied (output) to the first clutch C1, the second clutch C2, and the fourth brake B4 to start the processing of the backward preparation mode (R preparation) in step 3 as illustrated in FIG. 15, the processing proceeds to step 3'. In step 3', the aforementioned switching oil pressure is calculated. The switching oil pressure is requested to switch the first brake B1 from the reverse-rotation preventing state to the fixed state. Thereafter, the processing proceeds to step 4.

If the rpm Nin of the input shaft 2 is the predetermined rpm or less in step 5, the processing proceeds to step 5'. In step 5', it is determined whether the line pressure is equal to or higher than the aforementioned switching oil pressure. If the line pressure is lower than the switching oil pressure, the processing proceeds to step 9 to increase the line pressure so as to be equal to or higher than the switching oil pressure using the oil-pressure regulating unit 43c and then to terminate the current processing. If the line pressure is equal to or higher than the switching oil pressure, the processing proceeds to step 6.

The flowchart of FIG. 16 is the same as the flowchart of FIG. 8, except that step 17' is included in steps 17 and 18 and that steps 19' and 25 are included in steps 19 and 20, compared with the flowchart of FIG. 8. Therefore, the same processes as FIG. 8 are performed in FIG. 16 in the steps having the same reference numerals as those of FIG. 8 and thus the description of the same processes will be omitted.

As illustrated in FIG. 16, oil pressure is supplied (output) to the second brake B2, the third brake B3, and the fourth brake B4 so as to fasten the second brake B2, the third brake B3, and the fourth brake B4 in step 17 and then the processing proceeds to step 17'. In step 17', the aforementioned switching oil pressure is calculated. The switching oil pressure is requested to switch the first brake B1 from the reverse-rotation preventing state to the fixed state. Thereafter, the processing proceeds to step 18.

If the rpm Nin of the input shaft 2 is equal to or more than the predetermined rpm in step 19, the processing proceeds to step 19'. In step 19', it is determined whether the line pressure is equal to or higher than the aforementioned switching oil pressure. If the line pressure is lower than the switching oil pressure, the line pressure is increased in step 25 so as to be equal to or higher than the switching oil pressure and then the current processing is terminated. If the line pressure is equal to or higher than the switching oil pressure, the processing proceeds to step 20.

DESCRIPTION OF REFERENCE NUMBERS

TM Automatic transmission
1 Transmission case (Housing)
2 Input shaft (Input member)
3 Output member (Output gear)
42 Shift lever
43 Hydraulic control circuit
43a Oil-temperature detection unit
43b Oil-pressure detection unit
43c Oil-pressure regulating unit
44 Vehicle speed detection unit
46 Engine brake determination unit
48 Drive source rpm detection unit
50 Input rpm detection unit
52 Output rpm detection unit
54 Brake pedal detection unit
56 Accelerator opening degree detection unit
ENG Drive source
ECU Control unit
LC Lockup clutch
DA Damper
TC Torque converter
PGS1 First planetary gear mechanism
Sa Sun gear (First element)
Ca Carrier (Second element)
Ra Ring gear (Third element)
Pa Pinion
PGS2 Second planetary gear mechanism
Sb Sun gear (Sixth element)
Cb Carrier (Fifth element)
Rb Ring gear (Fourth element)
Pb Pinion
PGS3 Third planetary gear mechanism
Sc Sun gear (Seventh element)
Cc Carrier (Eighth element)
Rc Ring gear (Ninth element)

Pc Pinion
PGS4 Fourth planetary gear mechanism
Sd Sun gear (12th element)
Cd Carrier (11th element)
Rd Ring gear (10th element)
Pd Pinion
C1 First clutch
C2 Second clutch
C3 Third clutch
B1 First brake (Switching mechanism)
B2 Second brake
B3 Third brake
B4 Fourth brake

What is claimed is:

1. An automatic transmission comprising:
a housing;
a drive source;
an input member arranged in the housing to which motive power of the drive source is transmitted;
a planetary gear mechanism comprising a plurality of elements rotatable in the housing;
a plurality of engagement mechanisms configured to switch between a connected state wherein at least one of the plurality of elements is connected to another of the plurality of elements and a first fixed state wherein the at least one or another of the plurality of elements is fixed to the housing;
an output member; and
a control unit configured to control the plurality of engagement mechanisms,
the automatic transmission configured to shift rotation of the input member in multiple stages and freely output the rotation from the output member and further comprising:
a switching mechanism configured to switch between a reverse-rotation preventing state where a normal rotation by which a vehicle runs in a forward direction is allowed and a reverse rotation by which the vehicle runs in a backward direction is prevented with respect to one of the plurality of elements and a second fixed state where the one of the plurality of elements is fixed to the housing, wherein:
the control unit is configured to bring the switching mechanism into the reverse-rotation preventing state when a shift position is in a forward range and bring the switching mechanism into the second fixed state when the shift position is in a backward range;
the control unit is configured to perform a backward preparation mode which enables an rpm of the one of the plurality of elements fixed by the switching mechanism to be a predetermined rpm or less by bringing the one of a plurality of engagement mechanisms into the connected state or the first fixed state when the shift position is switched from the forward range to the backward range; and
the control unit is configured to switch the switching mechanism from the reverse-rotation preventing state to the second fixed state after the rpm of the one of the plurality of elements becomes the predetermined rpm or less by performing the backward preparation mode.

2. The automatic transmission according to claim 1, further comprising:
an oil-temperature detection unit which detects oil temperature; and
a vehicle speed detection unit which detects running speed of a vehicle,
wherein the control unit sets a predetermined time period according to the oil temperature detected by the oil-temperature detection unit and the vehicle speed detected by the vehicle speed detection unit and determines whether the rpm of the one of the plurality of elements is the predetermined rpm or less based on whether the predetermined time period has elapsed.

3. The automatic transmission according to claim 1, further comprising a hydraulic control circuit, wherein:
the hydraulic control circuit comprises:
an oil-pressure detection unit which detects a line pressure;
an oil-pressure regulating unit which regulates the line pressure; and
a slider movable by the line pressure supplied thereto,
the switching mechanism is switched into the reverse-rotation preventing state or the second fixed state by movement of the slider; and
the control unit increases the line pressure by using the oil-pressure regulating unit when the line pressure detected by the oil-pressure detection unit is less than pressure necessary to switch the switching mechanism to the reverse-rotation preventing state or the second fixed state.

* * * * *